Aug. 16, 1949.　　　　　E. R. LOCHMAN　　　　　2,478,929
MACHINE TOOL
Filed Feb. 28, 1944　　　　　　　　　　　　13 Sheets-Sheet 5

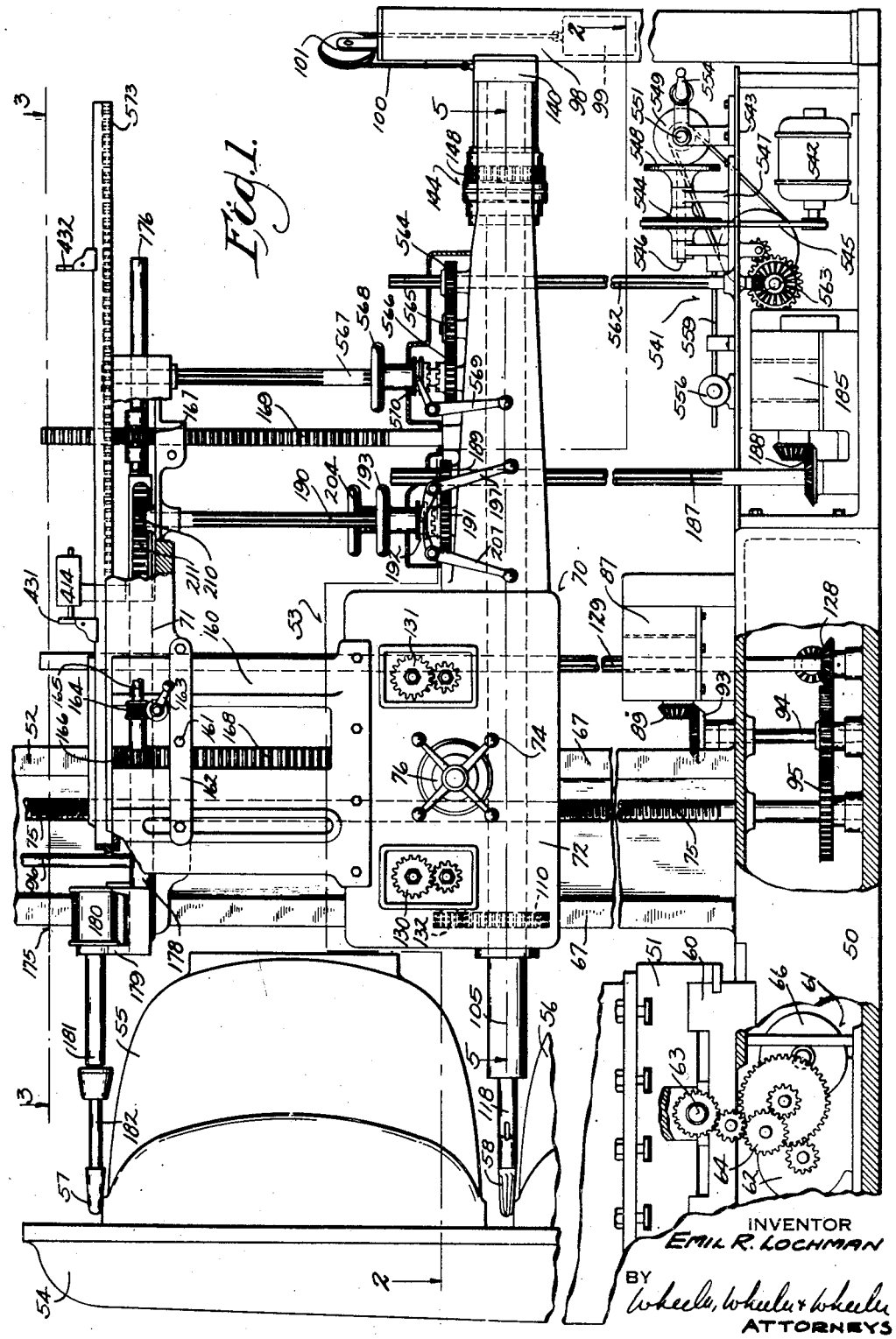

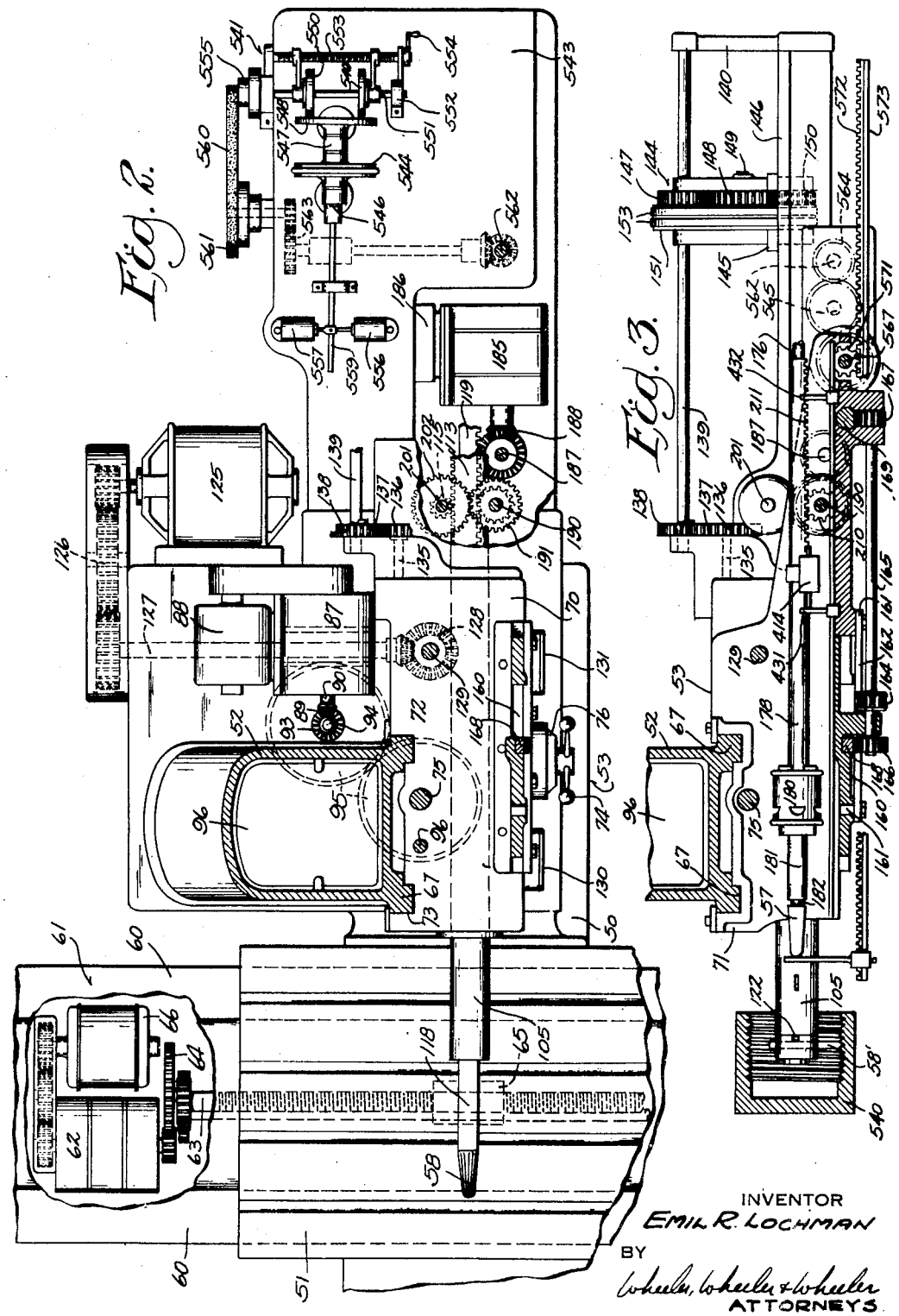

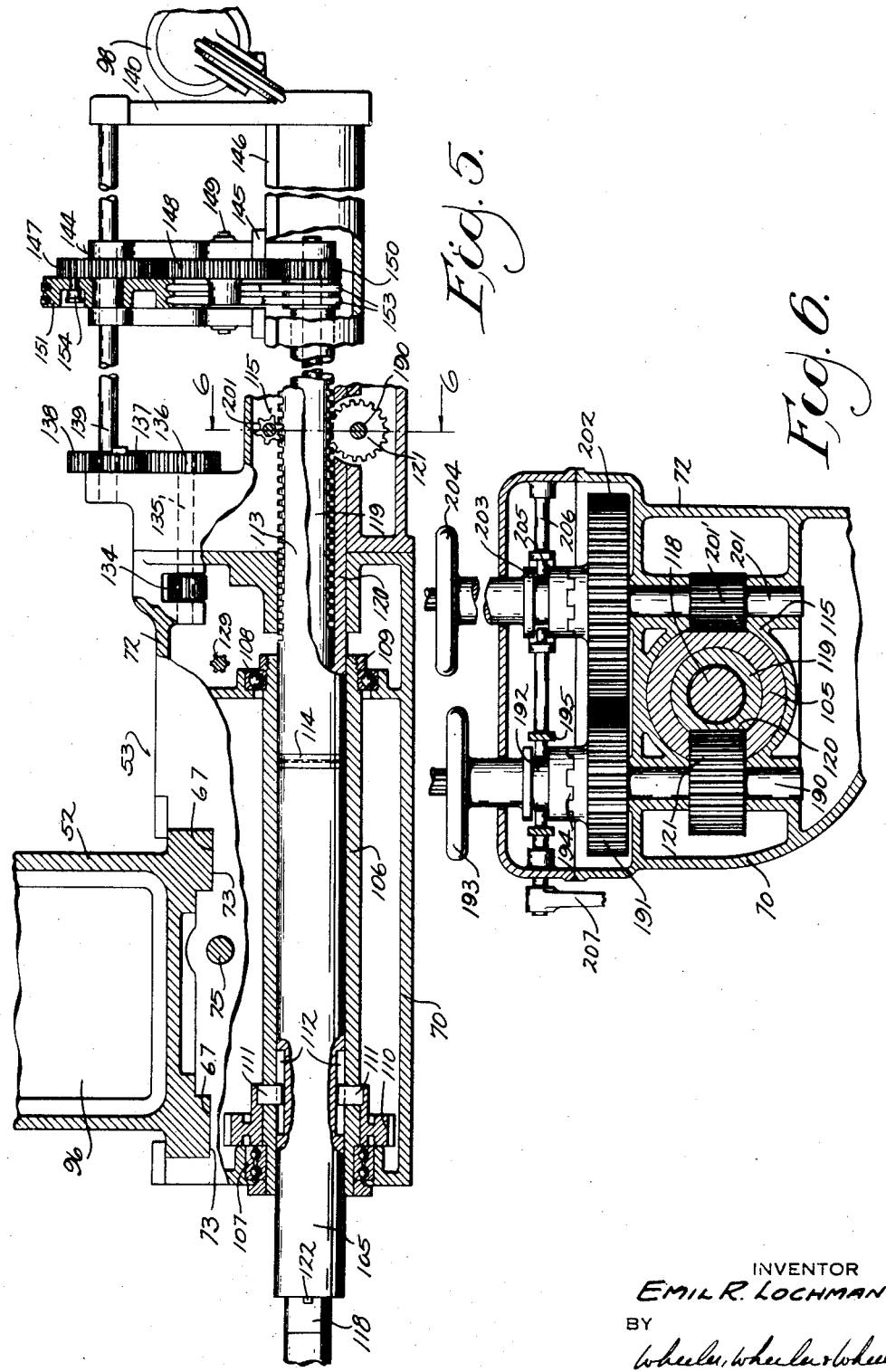

INVENTOR
EMIL R. LOCHMAN
BY
Wheeler, Wheeler & Wheeler
ATTORNEYS

INVENTOR
EMIL R. LOCHMAN
BY
Wheeler, Wheeler & Wheeler
ATTORNEYS

Aug. 16, 1949.  E. R. LOCHMAN  2,478,929
MACHINE TOOL

Filed Feb. 28, 1944  13 Sheets-Sheet 7

INVENTOR
Emil R. Lochman
BY
Wheeler, Wheeler & Wheeler
ATTORNEYS

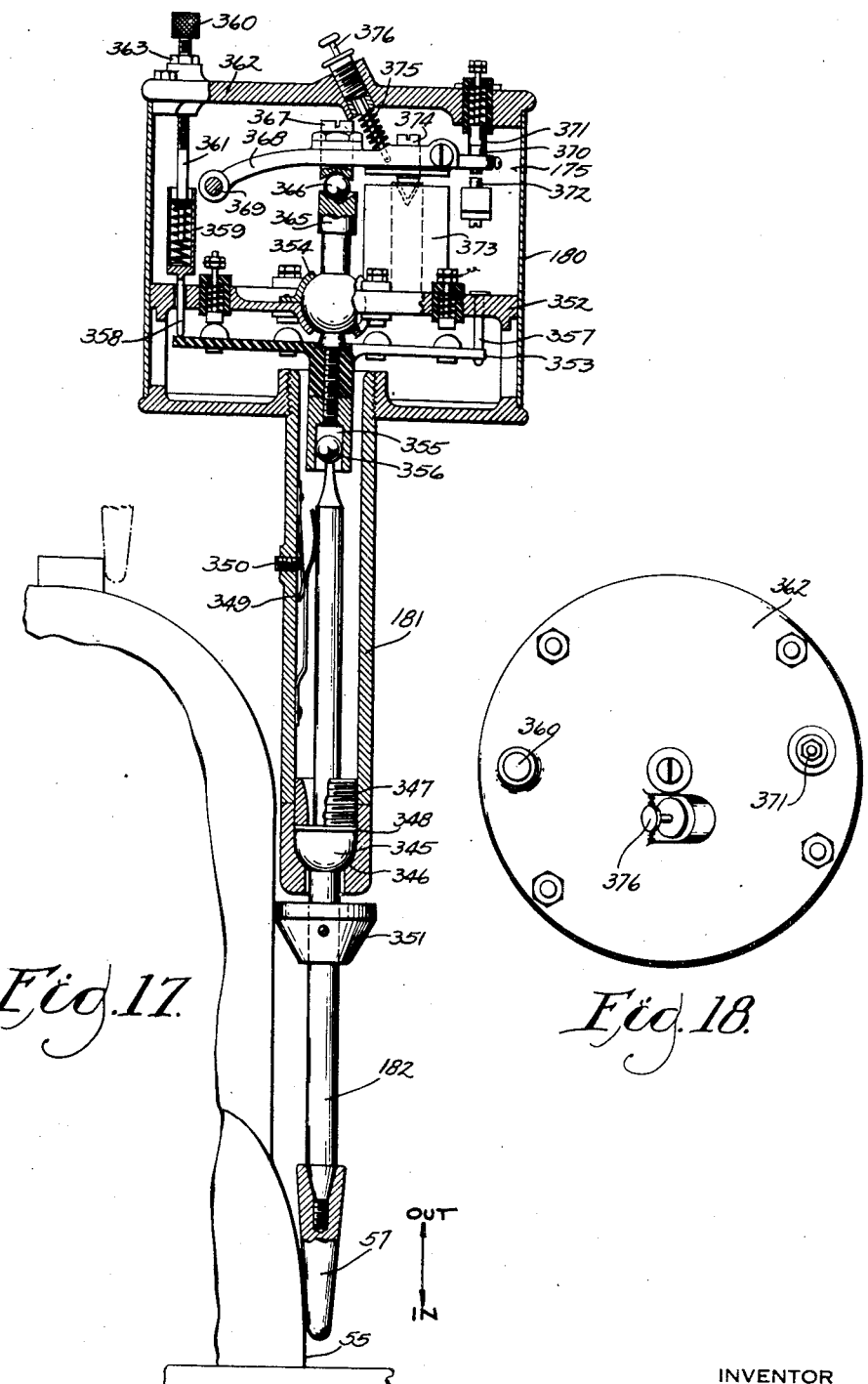

Aug. 16, 1949.  E. R. LOCHMAN  2,478,929
MACHINE TOOL
Filed Feb. 28, 1944  13 Sheets-Sheet 9

INVENTOR
EMIL R. LOCHMAN
BY
Wheeler, Wheeler & Wheeler
ATTORNEYS

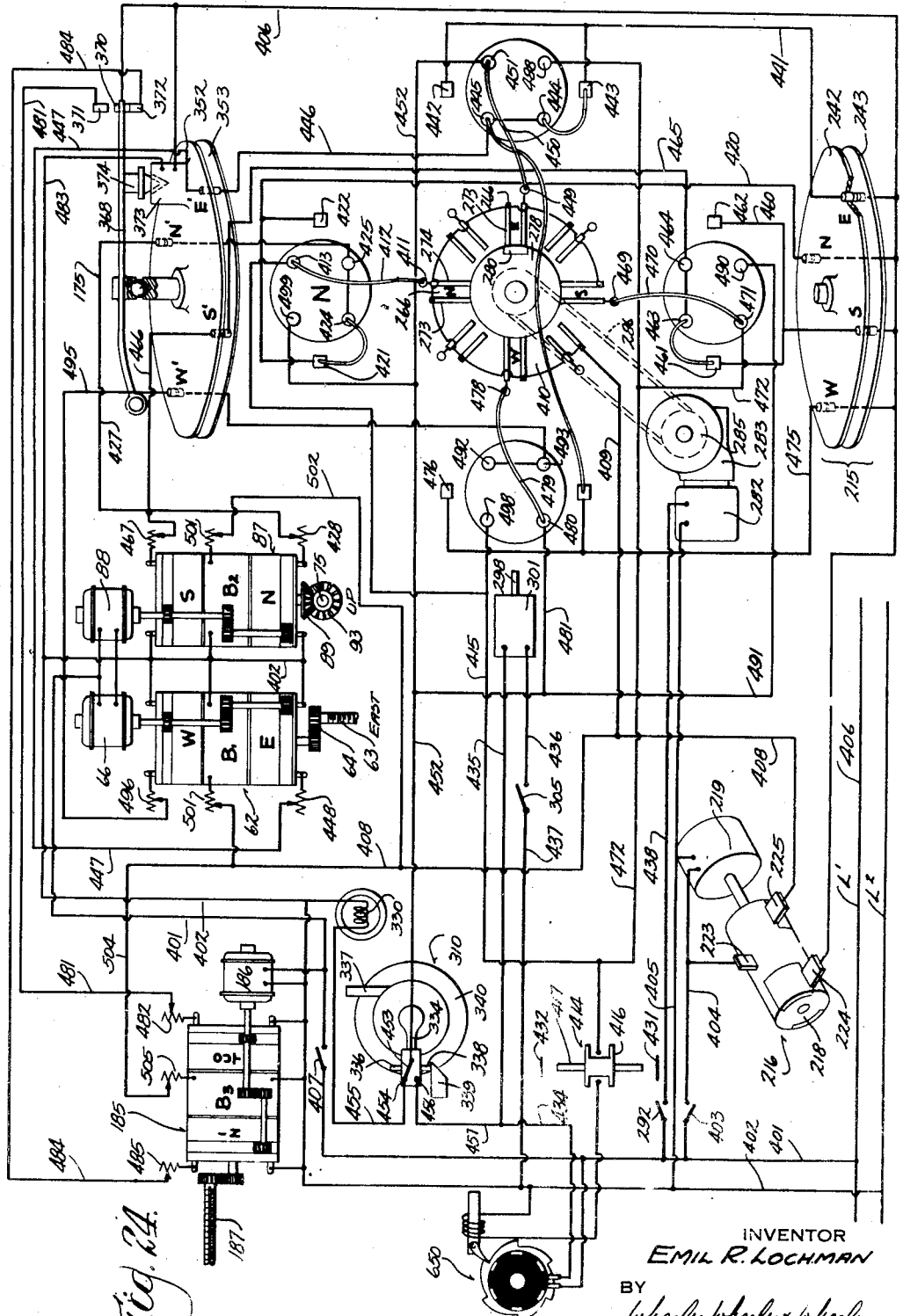

Aug. 16, 1949.  E. R. LOCHMAN  2,478,929
MACHINE TOOL

Filed Feb. 28, 1944  13 Sheets-Sheet 11

INVENTOR
EMIL R. LOCHMAN
BY
Wheeler, Wheeler & Wheeler
ATTORNEYS

Aug. 16, 1949.　　　　E. R. LOCHMAN　　　　2,478,929
MACHINE TOOL

Filed Feb. 28, 1944　　　　　　　　　　　　　　13 Sheets-Sheet 12

INVENTOR
*Emil R. Lochman*
BY
*Wheeler, Wheeler & Wheeler*
ATTORNEYS

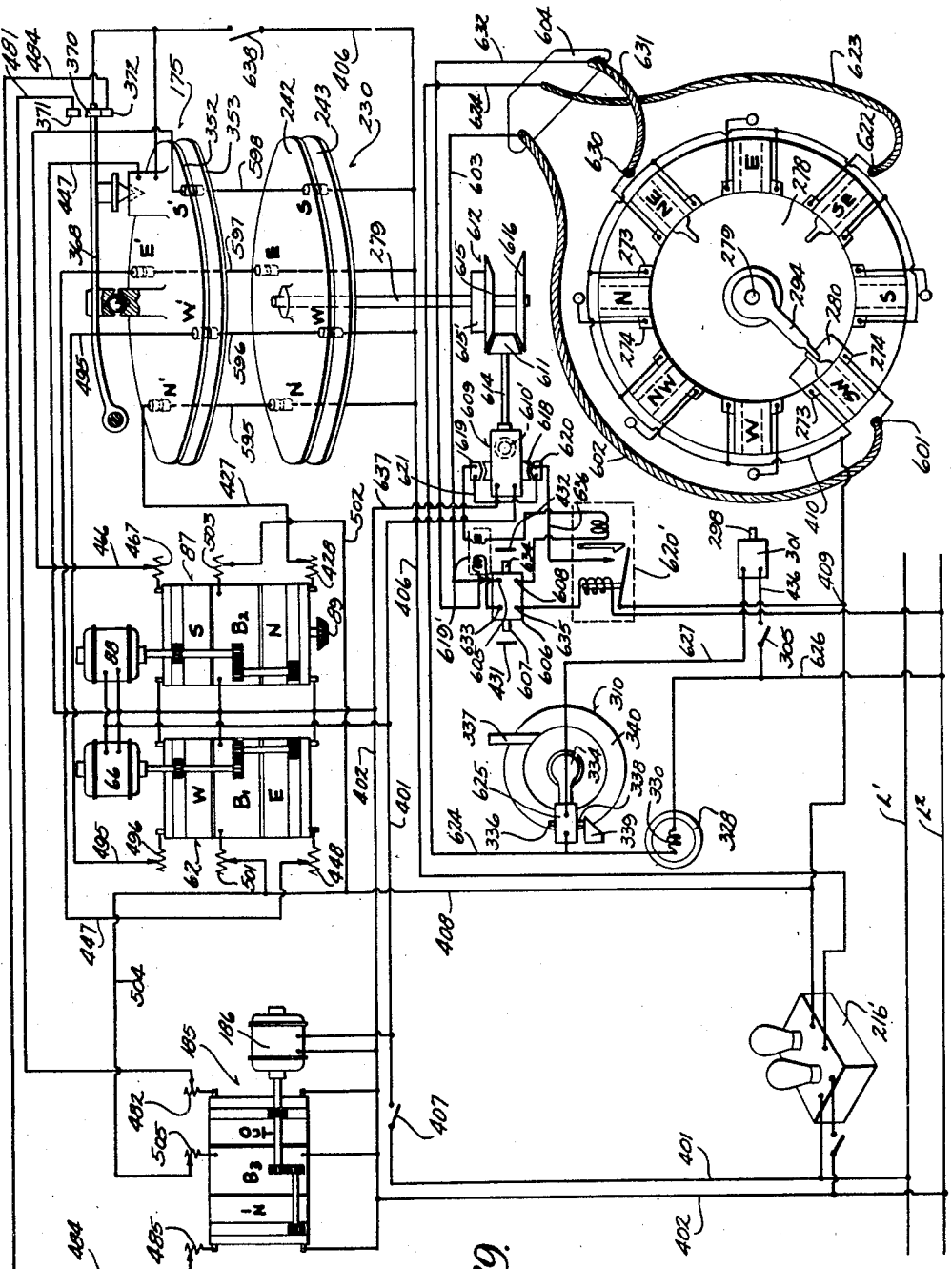

Patented Aug. 16, 1949

2,478,929

UNITED STATES PATENT OFFICE 2,478,929

MACHINE TOOL

Emil R. Lochman, Milwaukee, Wis.

Application February 28, 1944, Serial No. 524,167

46 Claims. (Cl. 90—13.5)

This invention relates to improvements in machine tools and, more particularly, to a multiple purpose, tracer-controlled machine.

The present application is a continuation in part of my pending application 257,216, filed February 18, 1939, now abandoned.

It is the broad object of the present invention to provide a general purpose machine tool which, while adapted to perform routine machine tool work, is also adapted without major attachments to perform highly specialized work such as tracer-controlled die sinking, contouring, and curvilinear and rectangular cutting, as well as to make various combinations of straight, diagonal and curvilinear cuts for roughing and finishing. The present device is an improvement over the constructions shown in my Patents 1,084,155 and 1,774,279 and 2,254,229 (Re. 22,140).

Other objects of the invention are to provide a duplicating machine adapted either for manual regulation or for fully automatic operation; to provide a mobile control panel for facilitating regulation of the operation of the machine and permitting the operator to be stationed comfortably and to the best advantage for observation of the work during his regulation of the machine; to provide for vibration of the tracer contacts to sensitize tracer response; to provide a multiple purpose tool in which the tracer may control machine functions other than pattern duplication; to provide in such a tool a tracer capable of universal lateral as well as axial response to control circuits appropriate to the direction of displacement; and to provide a novel clutch and brake set for sensitively controlling relative movement of machine parts.

Another object of the invention is to provide a novel and improved tracer and a novel electric circuit controlled by the tracer to determine clutch and brake operation without relays, thereby enabling the device to function much more rapidly than has heretofore been thought possible. It is, also, my purpose to provide a rectifying means and suitable circuits for dividing an A. C. current supply and distributing half cycles respectively to the brake mechanism and to the tracer-controlled clutch mechanism for the alternate energization thereof, also energizing other parts of the apparatus intermittently with half cycle current.

A double spindle arrangement herein disclosed is covered in a companion application filed concurrently herewith as a division of the aforesaid parent application 257,216.

The foregoing and other objects and advantages of the present invention, which will become more fully apparent upon reference to the following detailed specification, may be achieved by means of the structure described herein by way of example and illustrated in the accompanying drawing, in which:

Figure 1 is a front elevation of a multiple purpose tracer-controlled machine.

Figure 2 is a top sectional view taken substantially along the line 2—2 of Fig. 1 showing the base, column, spindle headstock and the clutch-brake sets adapted to effect relative movement of the various machine units.

Figure 3 is a top sectional view showing the relationship of the tracer and tracer headstock to the cutter spindle, spindle headstock and column and taken substantially along the line 3—3 in Figure 1.

Figure 5 is a sectional view of the spindle headstock and carriage together with a view of the inner and outer spindles therein as taken along the line 5—5 in Figure 1.

Figure 6 is a cross-sectional view of the inner and outer spindle feed mechanism as taken along the line 6—6 in Figure 5.

Figure 17 is a vertical section of the tracer head with the tracer tool attached thereto in operational contact with a given pattern.

Figure 18 is a top plan view of the cover on the tracer head.

Figure 24 is the wiring diagram for the entire tracer-controlled machine.

Figure 29 is a modification incorporated into the wiring diagram wherein many of the jumper wires required in the circuit shown in Figure 24 are eliminated.

Figure 4:
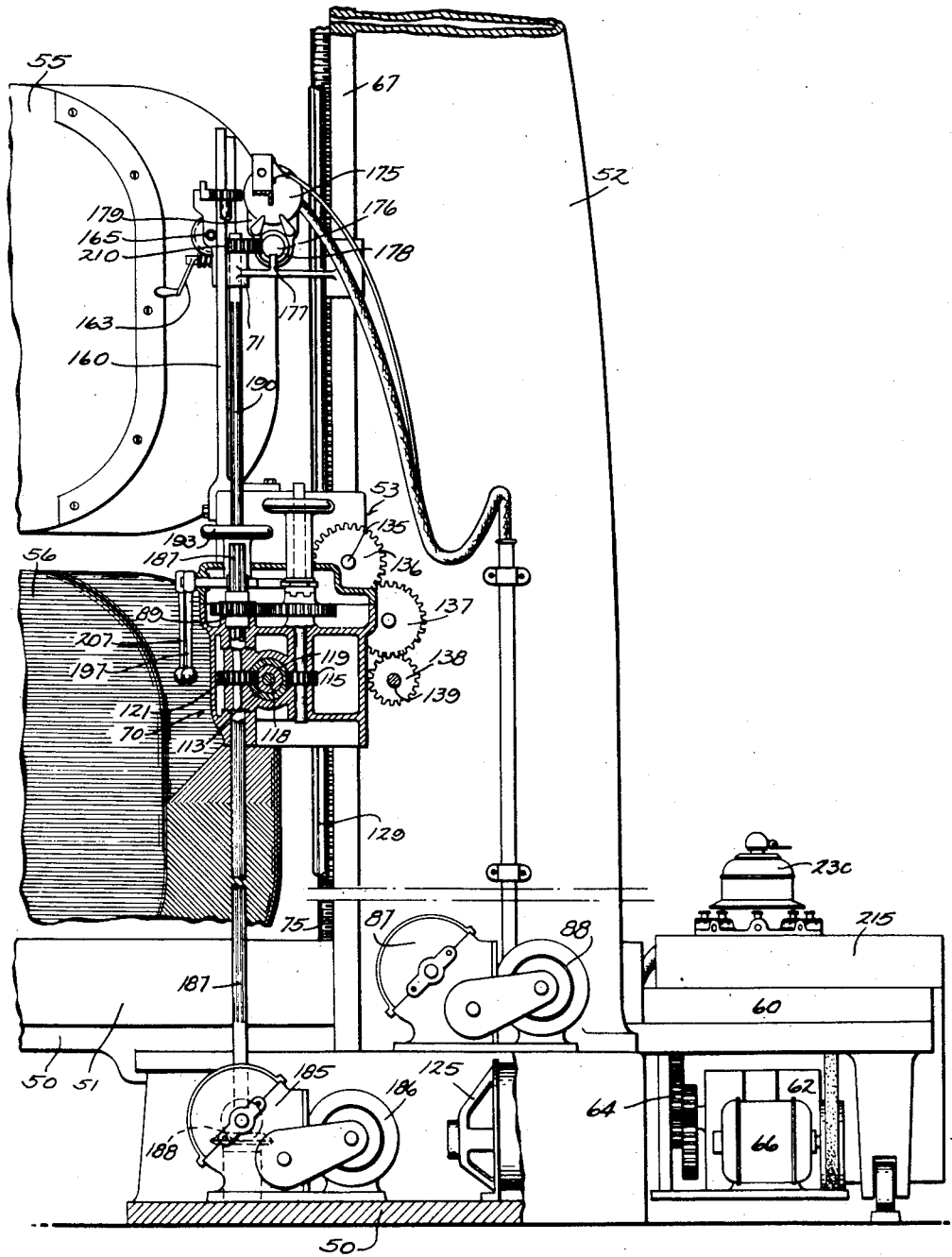
Figure 4 is a rear elevational view of the machine with certain parts broken away and with the mobile control panel adjacent thereto.

The accompanying drawings show a practical application of the principles of the present invention as embodied in an automatic machine tool adapted to duplicate, upon a work piece, the contour and outline of the whole or any part of a given pattern with a high degree of precision and speed.

As generally shown in Figure 1, the automatic machine tool consists of a base 50, a work and pattern supporting table 51 and an upright column 52 with its appending tracing and cutting mechanisms 53. A fixture 54 bolted to the table 51 serves to support a pattern 55 and work piece 56 in operable relation to a tracer tool 57 and cutter 58 mounted in said tracing and cutting mechanism 53. The tracing and cutting mechanisms 53 are designed for unified relative movement in three directional planes with the supporting table. The directional movements originate from three reversible magnetic clutch and brake elements, such as were shown in patent application Serial No. 409,095, dated August 30, 1941, now Patent No. 2,470,103, granted May 17, 1949. These elements constitute a part of a coordinated electrical control system in which alternating current is separated into two half cycle pulsating currents, one being used to operate the magnetic clutches and the other to operate the magnetic brakes. Thus an intermittent braking action occurs once in each cycle and alternate clutching occurs during the closure period of the electrical contacts in the tracer mechanism and the master control set; the opening of any of the tracer contacts prevents the completion of the clutching impulse of the corresponding clutch while the brake continues to function and prevents any relative movement in a given direction.

Referring to Figures 1 and 2, the base 50 for the machine tool consists of a horizontally disposed hollow casting appropriately webbed and T shaped, with the head portion of the T serving as a bed for the table 51 and the stem portion supporting the column 52. The table 51 is disposed to operate longitudinally along spaced ways 60 on the base 50 and is gibbed thereto in the usual manner.

Controlled reciprocation is imparted to the table 51 by a magnetic clutch drive and transmission mechanism 61. This mechanism consists of a reversible clutch and brake element 62 in driving connection with a journalled table screw 63 through speed reduction gearing 64. A nut 65 threaded on the screw 63 and fixed on the underside of the table 51 imparts the driving motion to the table.

The clutch and brake element 62 is of the same type as is shown in patent application Serial No. 409,095, dated August 30, 1941, in which two clutch elements are constantly rotated oppositely from one another by a motor 66 while a third element remains stationary and serves as a brake. The respective clutch plates complementary to said elements are fixedly mounted on the shaft and drive the speed reduction gearing 64, the screw 63 and consequently move the table 51 in either direction or effectively brake the driving means therefor. Clutching is effected magnetically, that is, the clutch plate associated with an energized element is magnetically attracted thereto and frictionally engaged with the element, whereby the motion or state of rest of the element is thereby imparted to the clutch plate and drive shaft. A controlled half cycle current is directed to the magnetic coils of the clutch housings while the opposed half cycle current is constantly directed to the magnetic brake coils. (See description hereinafter of Fig. 29.)

A hollow column 52 is fixedly attached on top of the base 50 in such a position that the tracing and cutting mechanism 53 operating thereon will be in vertical alignment adjacent the center of the table supporting bed. The tracing and cutting mechanism 53 is slidably mounted on two way surfaces 67 integrally formed on the side of the column. The mechanism 53 consists of a spindle headstock 70 and a tracing headstock 71. The spindle head casing 72 includes two corresponding way surfaces 73 which are adapted to contact the way surfaces 67 on the column and carry the entire spindle head.

Vertical movement of the spindle and tracer headstocks 70 and 71 may be accomplished by manual or power driven means. Manual adjustment is effected by the manipulation of a star handwheel 74 appropriately mounted on the front side of the spindle headstock 70 and connected via shafting and gearing (not shown) with a screw shaft 75. The shaft 75 is vertically disposed and rotatably journaled in the base 50 and in the column 52. A micrometer dial 76 operably mounted with the handwheel 74 permits exact vertical adjustment of the headstocks when necessary.

The tracing headstock 71 is slidably supported on the column ways 67 above the spindle headstock 70, as shown in Figures 1, 2 and 3. A bracket 160 bolted on the top edge of the spindle headstock casing 72 is vertically disposed and slotted to support the tracing headstock 71. The contacting surface of the headstock 71 is recessed to receive the bracket 160 and thereby insure the accurate retention of the headstock in a horizontal plane throughout its entire range of vertical adjustment. This adjustment is necessary to vary the vertical spacing between the tracer tool 57 and the cutter 58, the said spacing being dependent upon the width of the pattern 55 and workpiece 56 mounted on the retaining fixture 54. Increased stability is insured if the minimum spacing is determined for any given pattern and workpiece. Bolts 161 extend through a clamping plate 162 on the outer face of bracket 160 and are threadably imbedded in the frame of the headstock 71 in a manner to lock the headstock 71 in any desired position in relation to the spindle headstock 70. To facilitate the actual vertical adjustment of the tracer headstock 71, a manually operated crank mechanism 163 (see Figures 1 and 4) connected with a worm and worm wheel 164 on the headstock serves to effect the rotation of a shaft 165 supporting two gears 166 and 167. These gears operably mesh with the teeth on two stationary and vertically disposed racks 168 and 169. The rack 168 is integrally formed on the front face of the bracket 160 attached to the spindle headstock 70 while the rack 169 is attached to the rearward end of the headstock 70 and slidably supported by the headstock 71. Thus the tracer headstock 71 may be vertically adjusted in relation to the spindle headstock 70 with comparative ease but without any possibility of effecting the misalignment of the headstock 71 and consequently reducing the accuracy of the tracing operation performed with this apparatus. In setting up the machine for any given tracing operation, the operator need only loosen the bolts 161, manipulate the crank mechanism 163 until a predetermined distance between the center of the tracer tool 57 and the center of the cutter 58 is reached and then tighten the bolts 161 to retain the tracer headstock in the desired position.

Tracer mechanism 175 consists of the electrical control mechanism which is actuated by the axial or sideward movement of the tracer stylus 57 during its travels over the surface of a pattern. The location of the tracer mechanism 175 on the tracer headstock 71 is best illustrated in Figures 1, 3 and 4. The mechanism is, of necessity, axially motivated in a plane parallel to the axis of the spindles 105 and 118. This is accomplished by slidably supporting the tracer mechanism 175 on a bar 176. The bar is longitudinally fastened on the top edge of a horizontally disposed flange 177 integrally formed on the headstock 71 and, when attached in this manner, the bar must be in exact parallel alignment with the spindles 105 and 118. A slotted tube 178 fitted in movable longitudinal contact with the bar 176 supports the tracer mechanism 175 at its foremost end. The mechanism 175 is detachably carried with the tube 178 by means of a casting 179 attached to the tube and designed to cradle the mechanism. Clamping means, not shown, facilitate the removal of the tracer mechanism 175 from the headstock 71. The tracer comprises a transparent casing 180; the finely adjusted mechanical and electrical mechanism therein are thus protected against dust and chip particles and yet remain visible to the operator for purposes of inspection. A casing 181 extending from the tracer mechanism serves to support a tracer rod 182. The tracer tool 57 is threadably retained on the extending end of the rod 182 in a manner to operably engage the pattern 55.

Automatic power feed for effecting vertical movement of the spindle and tracer headstocks 70 and 71 originates in a tracer-controlled clutch and brake set 87 mounted on the base 50 and driven by a motor 88. The operation of this set is identical with the operation of the clutch and brake set 62 previously described in the operation of the table 51. A pinion gear 89 mounted on the drive shaft 90 of the clutch set 87 meshes with a gear 93 keyed to a vertically disposed shaft 94 journalled in the base 50. A speed reduction gear train 95 disposed between the shaft 94 and the screw shaft 75 transmits the tracer-controlled directional power from the clutch set 87 to the screw shaft 75 and consequently effects the upwardly or downwardly movement of the spindle and tracer headstocks. Thus the controlled electrical energization of one of the clutch units in the clutch and brake set will effect an upward movement of the headstocks while energization of the other clutch unit will effect a downward movement of the headstocks 70 and 71. The brake unit of this set is energized by an opposed half cycle current and tends to lock the headstock in position intermediate any two given power movement cycles in either direction or in any combination of these two movements.

To facilitate a highly sensitively responsive vertical reaction of the spindle and tracer mechanism, a counterbalance 96 is supported within the hollow of the column 52 for vertical movement therein and is connected to the spindle headstock 70 by means of a cable 97 suspended over a pulley (not shown) rotatably mounted at the top of the column 52. The rearwardly extending portion of the spindle head casing 72 is likewise counterbalanced to prevent any misalignment of the mechanism. A hollow tube 98 is anchored to the rear of the base 50 and is adapted to carry a counterbalance 99 within its vertically disposed confines, said counterbalance being attached to the spindle head casing by a cable 100 suspended for operation on a rotatably mounted pulley 101.

A heavy-duty outer spindle 105 (see Figures 1, 2 and 5) is rotatably mounted in the spindle head casing 72 and is adapted to be axially extended or retracted therein. A driving sleeve 106 is supported by two bearings 107 and 108 and locked in position with a locking nut 109. A driving gear 110 is splined onto the outer surface of the driving sleeve 106 adjacent the front bearing 107. Two keys 111, in the sleeve 106 and the hub of gear 110, fit into a pair of oppositely disposed slots 112 on the periphery of the spindle 105 and impart the rotative movement of the gear 110 and sleeve 106 to the spindle 105 no matter what the axially adjusted position of the spindle may be. The outer spindle 105 may be axially adjusted either prior to a cutting operation, or during the cutting operation as governed by the tracer, or during the cutting operation at a fixed feed rate, without interfering with the driving mechanism of the said spindle. The spindle 105 extends rearwardly into an extending portion of the headstock 70 and is slidably supported therein over a comparatively large surface to assure sturdiness, especially during heavy cutting operations. The ram portion 113 of the spindle 105 is locked against rotation and is fastened to the rotatable spindle by a thrust bearing 114. Axial feed control of the spindle is effected by a rack and gear drive 115 on the periphery of the non-rotatable ram portion 113 of the spindle.

A high-speed inner spindle 118 is axially disposed within the outer spindle 105. Various pin and roller bearings (not shown) serve to permit rotation of the spindle 118 independent of the speed of rotation of the outer spindle 105. A non-revolving inner ram 119 extends over the rearward end of the inner spindle 118 and is enclosed within the outer spindle 105. Axial feed control of the inner spindle 118 and ram 119 is obtained through a rack 120, gear pinion 121. The rack 120 is integrally formed on the outer side of the ram 119 while the pinion 121 thereof is operably engaged with the rack through a longitudinal slot in the ram 113 of the outer spindle 105. Through the drive means 120, 121, it is possible to effect an axial adjustment of the inner spindle 118 and ram 119 before a cutting operation, or during a cutting operation according to the dictates of the tracer, or during a cutting operation at a fixed rate of feed. All of these feeding movements occur without interfering with the driving mechanism of either the outer spindle 105 or the inner spindle 118.

The forward extending end of the inner spindle 118 is tapered in a manner well known to the machine tool industry to receive a standard cutting tool or grinder 58. For light and fast tracing operations the inner spindle 118 is used independently of the outer spindle 105 and the latter serves at any desired extension primarily as a stabilizing support. However, for heavy cutting, the spindle 118 is retracted until the extending ends of the two spindles are in alignment and a heavy duty type of cutter or grinder 58', such as is indicated in Fig. 3, is then mounted in the tapered end of the inner spindle 118, as before described. The back face of this type of cutter or grinder is slotted to receive a driving tongue 122 attached to the end of the outer spindle 105. Thus the driving torque of the spindle 105 is imparted to the cutter 58', the two spindles being keyed together by reason of their common connection to the tool. In both cases the cutter is locked in position by means of tapered wedges inserted and locked in a diametrical slot through both spindles. This locking means was fully shown and descerbed in copending application No. 257,216, filed February, 18, 1939.

The rotative power source for the two spindles is a motor 125 mounted on the base 50 (see Figure 2). A gear train 126 transmits the power from the motor 125 to a horizontally disposed shaft 127 within the base 50. A pair of bevel gears 128 effect the transmission of power from the shaft 127 to a splined shaft 129 vertically journalled in the base 50 and extending upwardly to the top of the column 52. The splined shaft 129 is rotatably journalled at the top of the column. The usual splined coupling (not shown) within the spindle headstock permits the transmission of power from the splined shaft 129 to the spindle drives irrespective of the vertical positioning of the headstock 70. Thus the outer spindle 105 or the inner spindle 118 may be effectively rotated for a cutting or grinding operation at any position of the spindle headstock 70 on the column 52.

Within the headstock the power is distributed to a pair of pick-off gear transmissions 130 and 131. The transmission 130 is designed to furnish a low speed range for the operation of the outer spindle 105. Appropriate shafting and gearing 132 (see Figure 1) interconnects the transmission 130 with the previously described driving gear 110 slidably mounted on the driving sleeve 106 in a manner to effect the rotation of the outer spindle 105. Since the outer spindle is primarily used for heavy cutting operations, the range of the pick-off gear transmission 130 would be extremely low. The pick-off gear transmission is arranged to cover a wide range of high speed for driving the inner spindle 118. Both of the transmissions 130 and 131 are of a standard design well known to the machine tool industry and therefore need not be described in detail. They are both conveniently located on the side of the spindle headstock 70 so that the machine operator may readily change the gears within the transmissions and thereby effect the faster or slower rotation of either the outer spindle 105 or the inner spindle 118 as the occasion demands. The power output from the transmission 131 is transmitted to a gear 134 (see Figure 5) by appropriate shafting and gearing (not shown). The gear 134 is keyed to a shaft 135, journalled in the spindle head casing 72, which carries a gear 136 at its rearward end. The gear 136 meshes with a gear 137 rotatably mounted and the latter meshed with a gear 138 on a splined shaft 139 journalled at its forward end in the casing 72 and at its rearward end in a bracket 140.

A carrier assembly 144 is fixedly attached to the rear end of the inner spindle ram 119 and is adapted to move therewith as the inner spindle 118 is axially adjusted. The assembly 144 is slidably supported by a pair of extending lugs 145 on the frame thereof which ride on a pair of ways 146 integrally formed on the spindle headstock casing 72 (see Figures 3 and 5). The carrier 144 is also slidably journalled on the splined shaft 139 in a manner that a gear 147 in the carrier is driven from the shaft 139 in all positions of the carrier. The gear 147 meshes with an intermediate gear 148 rotatably journalled in the carrier on a stub shaft 149. The gear 148 in turn meshes with a gear 150 keyed to the extreme rearward end of the inner spindle 118 which is suitably journalled in the carrier 144. The gear train formed by the gears 147, 148 and 150 serves to effect rotation of the inner spindle 118 at the slower range of speeds provided by the pick-off gear transmission 131. However, for the faster speeds it is necessary to remove the intermediate gear 148 from the carrier 144 and use a belt drive. This drive consists of a driving pulley 151 rotatably mounted on the hub of the gear 147 and a driven pulley 152 keyed to the inner spindle 118 adjacent the gear 150. A pair of V-belts 153 connect the two pulleys in the usual manner. When the driving pulley 151 is to be used, a series of spring retained plungers 154 are inserted to interlock the pulley with the gear 147. Thus the pulley 151 will receive rotation from the shaft 138 and will function unitarily with the gear 147. With the belt drive it is possible to drive the inner spindle 118 at the extreme high speeds required for finish grinding operations. When the belt drive is not being used, the plungers 154 are withdrawn from the gear 147 and the pulley 151 is then free to rotate on the hub of gear 147.

Simultaneous ram feeding of either or both spindles 105 and 118 and of the tracer mechanism 175 originates with a reversible tracer controlled clutch and brake set 185 driven by a motor 186; this set is operably identical with the clutch and brake set 62 previously described in connection with the table drive mechanism (see Figures 1, 2 and 4). The set 185 is located in the rear portion of the base 50. A vertically journalled splined shaft 187 is rotatably driven by the set through a pair of meshing gears 188. This shaft is rotatably journalled in the base 50 and is supported in the spindle headstock 70 by an integrally splined gear 189 rotatably retained in the said headstock. Thus the splined surfaces of the shaft 187 and of the gear 189 are constantly engaged throughout the entire vertical range of travel of the headstock 70.

The inner spindle 118 is extensibly or retractably fed by a rack and pinion drive mechanism 120 in the following manner (Figures 3, 4, 5. 6): A shaft 190 is journalled in the casing 72 and carries a pinion 121 meshing with the rack 120 on the periphery of the inner ram 119. A similar drive is provided for the outer ram. The pinion 201' meshing with rack 115 is keyed on the shaft 201 for operation on the outer ram rack. Gear 202 on the latter shaft 201 meshes at all times with gear 191. The shaft 190 is designed for constant operable engagement with these gears in any relative positioning of the two headstocks 70 and 71.

A clutch collar 192 and a hand wheel 193 integrally formed are slidably splined on the shaft 190 above the gear 191, in a manner such that mating teeth 194 on the clutch collar 192 and on the hub of the gear 191 are readily engageable and permit the transmission of power from the clutch and brake set 185 to the shaft 187, gear 189, gear 191, shaft 190, gear and rack drive 120 and consequently effect an "in-out" feed movement of the inner spindle 118 with the direction thereof dependent upon the direction of rotation of the clutch set. Disengagement of the clutch collar 192 is effected by a clutch fork 195 connected to actuate the collar and mounted on a manually operated rock shaft 196 journalled in the casing 72. Movement of a handle 197 on the operating face of the spindle headstock 70, as seen in Figure 1, will rotate the shaft 196 and fork 195 and thereby cause the clutch collar 192 to move upwardly out of engagement. With the handle 197 in the right hand position, as shown in Figure 1, the mated teeth 194 on the collar 192 and on the hub of the gear 191 are engaged to permit the feeding of the inner spindle 118 by the clutch set 185 electrically controlled by the tracer mechanism 175.

The outer spindle 105 is likewise axially operable from the clutch and brake set 185. The gear 202 is operably locked to the shaft 201 by means of a clutch collar 203 integrally formed with a hand wheel 204. Teeth on the bottom face of the collar 203 are designed to mesh with teeth on the hub of the gear 202. Since the collar 203 is splined to the shaft 201, the rotation of the gear 202 will effect a like rotation of the shaft 201 and consequently effect axial movement of the outer ram 113 and spindle 105 through the rack and gear drive 115. If it is desirable to have the outer spindle 105 remain stationary during the tracing operation, the teeth on the clutch collar 203 may be disengaged from those on the hub of gear 202. A clutch fork 205 operably engaged with the collar 203 serves to effect an axial movement of the collar 203 whenever a rock shaft 206 and handle 207 is manually actuated. The handle 207 on the front face of the spindle headstock 70 is designed to remain in either one of two positions, namely, one wherein the outer spindle feed mechanism is disconnected from the clutch and brake set 185, or wherein the feed mechanism is connected to be driven by the set 185.

Either of the spindles may be axially adjusted in relation to the other. If it is desired to manually extend or retract the inner spindle 118, the handle 197 actuating the clutch collar 192 is moved to disengage the inner spindle feed gear connection. The hand wheel 193 may be rotated clockwise to effectively retract the spindle or counterclockwise to extensibly feed the spindle from the headstock 70. Thereafter the handle 197 is manipulated to reengage the clutch collar 192 with the gear 191 and further automatic axial feed control of the tool spindles will retain the adjusted relationship between the said spindles. Conversely, if it is desired to adjust the outer spindle 105, the handle 207 is moved to disengage the clutch collar 203 from the outer spindle gear 202. The hand wheel 204 may then be rotated in either direction to effect a corresponding in or out movement of the outer spindle 105 without changing the position of the inner spindle 118. When a desired position has been attained, the handle 207 is again moved to reengage the clutch collar 203 with the gear 202 and thereby interlock the automatic feed drive for both the spindles.

It is well to remember that the drive gear 189 is connected to the clutch and brake set 185 and that this set is free to rotate when the aforementioned manual adjustments are made providing that the brake of the clutch set is not electrically energized.

The gear ratio of the spindle feed mechanism is such that the inner spindle 118 is axially fed at twice the feed rate of the outer spindle 105. Thus for a light cutting operation the outer spindle could be made to follow the axial movements of the rotating inner spindle and lend support to the latter especially while it was operated in the extreme extended ranges of travel. If, during a finish tracing operation, the outer spindle is not needed at all, the operator need only shift the handle 207 and render the outer spindle feed mechanism inoperative. Likewise, during a heavy cutting operation when the two spindles are locked together as previously described, the inner spindle feed mechanism is permitted to remain inoperative by shifting the handle 197 downwardly to the left of the position in which it is seen in Figure 1.

Coordinated feed control is necessary between the tracer mechanism 175 and the inner spindle 118 in order to have unified movement of the tracer tool 57 and cutter 58 upon the pattern and workpiece respectively. Remembering that the tracer mechanism 175 and the spindles must be fed in the same directions to and from the pattern and the work, it follows that the control of this feed movement must be interlocked with that of the spindles. Thus the shaft 190 extends upwardly and is journalled in the tracer frame 151 (Figures 1 and 3). A gear 210, keyed to the top end of shaft 190, is adapted to mesh with a gear rack 211 longitudinally and integrally formed on the side of the slotted tube 176. The rack 211 and gear 210 are of the same ratio as the rack and gear drive 121 controlling the feed movement of the inner spindle 118. The said feed mechanisms for the tracer and the inner spindle are not disengageable from each other and thus any manual adjustment of the inner spindle feed drive is correspondingly applied to the tracer feed drive.

One of the primary features of this machine is the exacting control which is maintained over the relative movement between the tracer and cutting mechanisms 53 and the pattern 55 and workpiece 56 mounted on the table 51. In the present machine, this control is electrically instigated, the nucleus thereof being situated in a unit known as a master control set 215 and in the tracer mechanism 175. The set 215 may, at all times, be within easy reach of the machine operator and preferably readily adapts itself to the various sizes of patterns and workpieces; these may range from patterns the size of a standard automobile body die downwardly to the size of a die used for making an automobile distributor rotor. The control set is mounted on castors and has flexible electrical connections to the rest of the apparatus so that it may be readily disposed at any point around the machine which proves to be most advantageous for the operator. Through this set, the operator has complete control over the operation of the entire machine, including each of the three relatively movable elements therein.

A rotary switch type of cycle separator 216 (Figures 7–11) is the means here used to exemplify the division of the alternating current supply into its intermittent D. C. components. The device is supported on a horizontal panel 217 within the control set 215, and is adapted to effect the division of standard alternating current into two half cycle, pulsating currents, one of which effects a tracer-controlled clutch movement in any one of the three clutch and brake sets, while the other current is used to effect an intermittent braking action in each of the clutch and brake sets at regular intervals determined by the frequency of the A. C. Thus, in a standard sixty cycle alternating current system, the current is effectively divided at the zero point of each cyclic sine wave and the two resulting half cycle pulsating currents each consist of sixty half cycle pulsations. The current is divided at the zero point of the sine waves in order to reduce to a minimum the arc which would otherwise normally occur at the tracer and master switch contacts.

Figure 7:
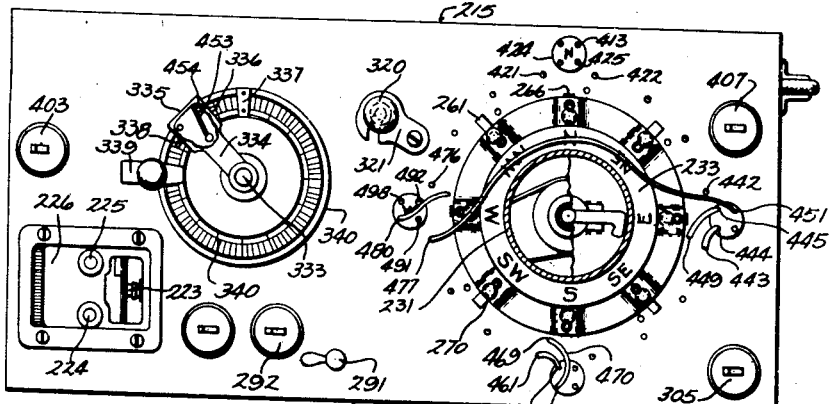
Figure 7 is a top plan view of the master control cabinet with a sectional view of the master control switch.
Figure 8:
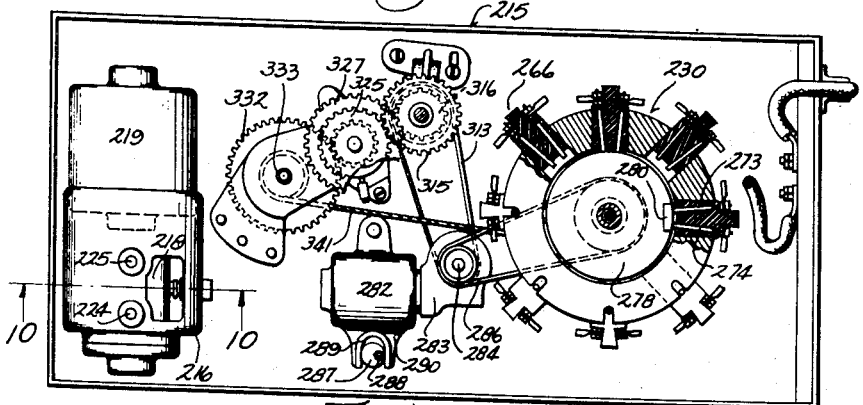
Figure 8 is a general top view of the various control mechanisms within the master control cabinet with the top panel thereof removed.
Figure 9:
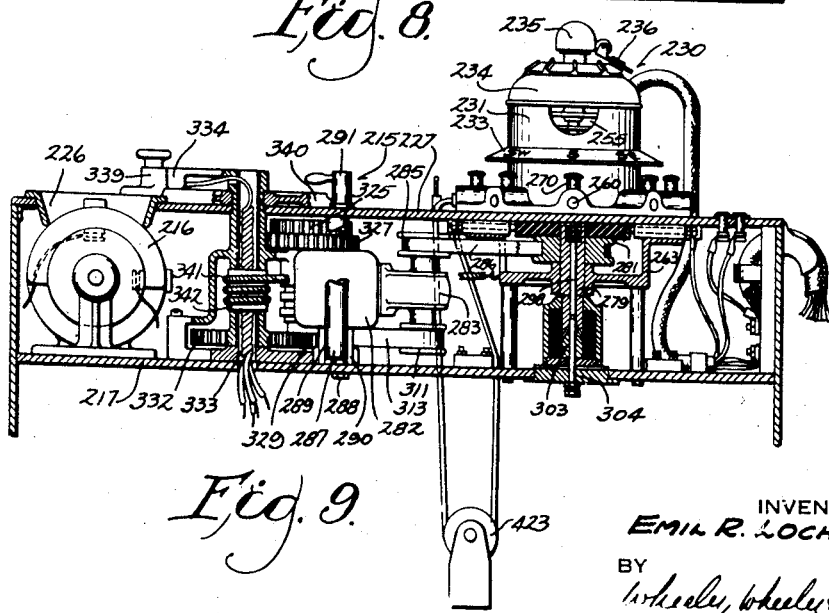
Figure 9 is a general side view of the master control cabinet with the side panel thereof removed to show the positioning of the various control mechanisms therein. Parts of the cross-feed control mechanism and of the master switch are broken away to show details thereof.
Figure 10:
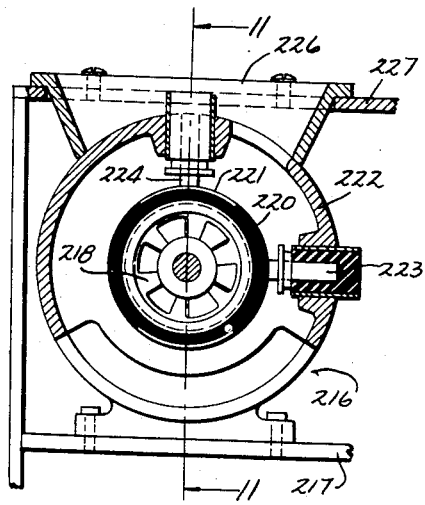
Figure 10 is a semi-sectional end view of the cycle separator taken substantially along the line 10—10 in Figure 8.
Figure 11:
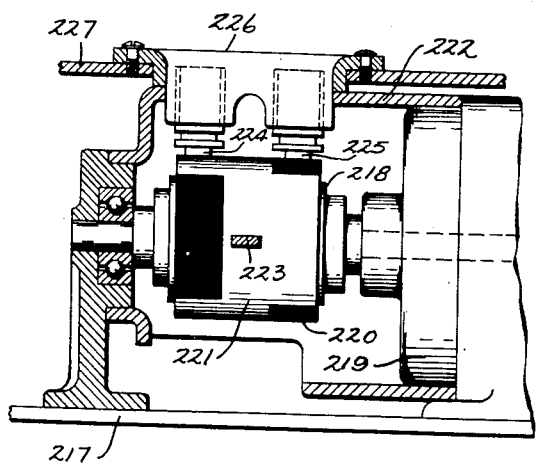
Figure 11 is a vertical longitudinal section taken along the line 11—11 of Figure 10 showing the cycle separator.

The mechanical type of cycle separator as generally shown in Figures 7, 8 and 9 and detailedly shown in Figures 10 and 11 incorporates the use of an insulated contact drum 218 keyed to the shaft of a small synchronous motor 219. Insulation 220 on the contact drum is undercut to receive a metallic contact 221. This contact is formed in a continuous band around the midsection of the drum 218 and contains staggered contact segments to fit corresponding recesses of approximately 90 degrees extent in the two end sections of the drum. A small dead area exists between opposite contact segments in order to prevent any overlap of the half cycle currents. A housing 222 is fitted over the drum and supports a spring biased brush 223 designed to remain in constant frictional contact with the midsection of the drum 218. Two insulated, spring biased brushes 224 and 225 are mounted in the housing 222 to ride on the respective end sections of the drum 218. The housing 222 is rotatably mounted in a manner that the brushes retained therein may be shifted to bring the brushes into synchronism with the motor and locked in said position. To facilitate adjustment, a recess cut in the housing 222 and fitted with a transparent window 226 fastened to a top panel 227 of the set 215 is provided so that the operator may observe the degree of sparking occurring at the point of contact between the three brushes and the drum. An alternating current is supplied to the brush 223 and half cycle current is taken from brushes 224 and 225. Alternatively, the cycle separator may consist of two series of copper oxide discs serially interconnected to the source of current in a manner to effect current rectification in a manner well known to the art, the one series supplying clutches and the other brakes of the several sets. A third suitable form of cycle separator involves the use of electronic tubes in the electrical circuit to effect a like division of alternating current into two half cycle pulsating currents.

Manual or automatic control of the sequence of operation of the machine tool is predeterminately set through the use of a master control switch 230 mounted in the top of the master control set 215. It is possible to set up the operative sequence of any two of the three relative movements. Thus, in the machine exemplified, it is possible with the use of the master control switch 230 (Figures 7, 8, 9, 14) to set up a sequence of operations between the table movement and the vertical movement of the spindle and tracer headstocks and thereby effect a series of rectangular step cuts across the face of the workpiece. It is also possible to predeterminately adjust the switch 230 to effect combinations of the two aforementioned driving movements and thereby produce a series of diagonal operating paths across the surface of the pattern and workpiece.

The master control switch 230 is enclosed in a circular casing 231 which, in turn, is fixedly attached to the top panel 227 of the master control set 215. A circular flange 232 fitted to the outer periphery of the casing has appropriate directional indicia upon its upwardly facing surface (Figure 7). The casing is enclosed with a cap 234 upon which a rotatable knob 235 is mounted. A swivelly mounted, directional indicator 236 fastened to the cap serves to indicate the contact closure effected within the switch during the manual operation thereof.

Figure 14:
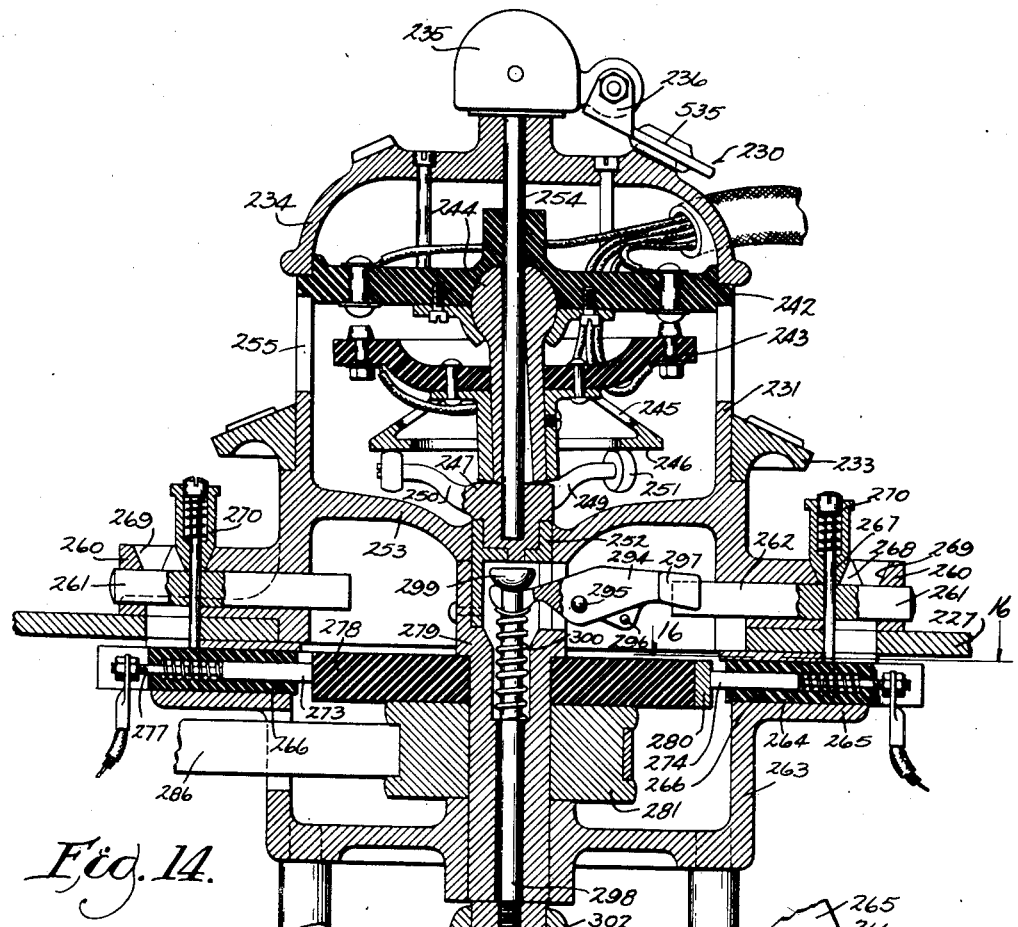
Figure 14 is a vertical section of the complete master control switch adapted to effect either manual or automatic control of the machine.

A stationary contact plate 242 is mounted in the upper portion of the switch 230, as shown in Figure 14, between the casing 231 and the cap 234 while a nutating contact plate 243 is centrally swiveled by a ball joint 244.

A web structure 245 riveted to the movable plate 243 includes an annular contact surface or track 246 which is exactly parallel to the plate 243 and is adapted to be engaged by a rotatable tilter 247. This tilter has three evenly spaced arms 248, 249 and 250; two of the said arms 248 and 249, having contact rollers 251, lie in a slightly higher plane than the third or low arm 250 also supporting a roller. The tilter 247 is keyed within the top end of a rotatable sleeve 252 journalled in a sectional wall 253 near the top of the casing 231. The rollers 251 of the tilter are free to ride on the track surface 246 of the web structure 245 attached to the movable contact plate 243 and effect a tilting action upon the plate.

A shaft 254 keyed in the hub of the tilter 247 extends upwardly through the hollow center of the universal joint 244 and contact plate 242 and outwardly through the center of the cap 234 where the knob 235 is attached to afford a manual control of the tilter 247. The four evenly spaced, spring mounted contacts designated as N, E, S and W on the stationary terminal head plate 242 are disposed to be engaged by the four similarly spaced contacts N, E, S and W, respectively, on the movable contact carrier plate 243.

Figure 15:
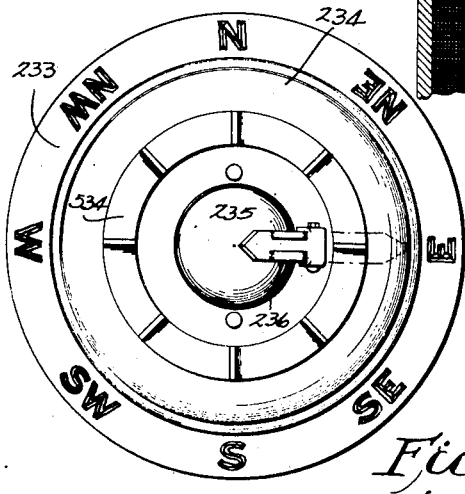
Figure 15 is a top view of the cap, control knob and indicators of said switch as shown in Figure 14.

Neither of the plates 242, 243 is rotatable. Four indicia N, E, S and W on the circular flange 233 designate adjacent contacts of the plates 242 and 243. An indicator 236 on the cap 234 is so correlated to the high side of contact carrier plate, as determined by the tilter to which shaft 254 is connected, that the indicator points to the contacts closed by the tilting of the carrier plate 243. For example, when the indicator points to E on the flange 233, the E contacts on the stationary and movable plates will be closed. Transparent windows 255 in the circular casing 231 about the periphery of the contact plate 243 permit the operator to observe these contacts and make any necessary adjustments. While the machine is automatically controlled, the indicator 236 hinged to the cap 234 is swung upwardly away from the cap in order to permit the unimpeded rotation of the mechanism (see Figure 15).

Figure 16:
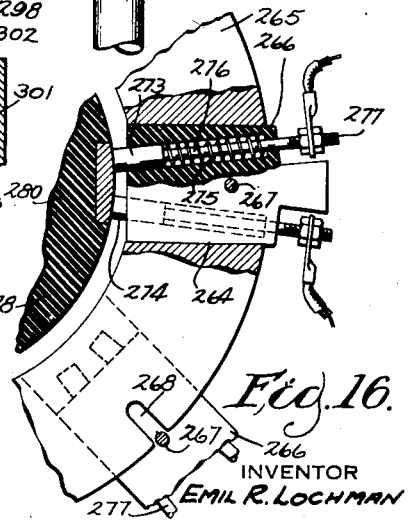
Figure 16 is a sectional view of the radially disposed brush sets in the master control switch taken substantially along the line 16—16 in Figure 14.

Eight radially extending bosses 260 integrally formed with the circular casing 231 are evenly disposed about its outer periphery and are in exact parallel alignment with the indicia on the flange 233. Thus there is a boss 260 for each indicia which will be individually referred to for convenience according to its respective indicia namely, N, NE, E, SE, S, SW, W, and NW. Each boss is adapted to receive a slidable stop pin 261 in a radial bore 262. A bottom frame portion 263 of the switch 230 is fixed beneath the top panel 227 of the control set 215 in axial alignment with the circular casing 231 and is appropriately supported on the panel 217. Eight rectangular slots 264 (see Figures 14 and 16) formed in the frame flange 265 are radially disposed about the circumference of the flange in a manner to correspond to the spacing of the bosses 260 in the casing 231; each slot is adapted to receive a similarly shaped brush block 266. The brush 266 and stop pin 261 are unitarily brought into an effective engaging position or removed therefrom by means of a vertically disposed pin 267 extending through the stop pin and anchored in the brush block. The limit of travel of the pin is determined by the length of the vertical slot 268 extending downwardly through the boss 260.

A cone shaped recess 269 cut into the top face of the boss 260 at each end of the vertical slot 268 is adapted to receive a spring biased handle 270 on the pin 267. This handle has a bottom surface tapered to correspond to that of the cone shaped recess 269 to lock the brush block 266 at either its innermost or outermost position. They may be moved by merely pulling the handle 270 upwardly and exerting side pressure. For rectangular tracing operations predetermined combinations of the four brush blocks and stop pins N, E, S and W may be used, whereas for diagonal operations, predetermined combinatons of the other four blocks and pins NE, SE, SW and NW may be used.

Each dielectric brush block is adapted to slidably support two mutually insulated brushes 273 and 274 within its insulated confines. The brushes are slidably retained in bores 275 within the brush block, subject to the bias of compression springs 276. Through each spring extends a conducting pin 277 embedded in the brush and extending outwardly from the block to provide a terminal for the electric wiring. The extensible limit of travel of the brush may also be limited by the adjustment of the terminal nut on the pin 277. The actual electrical wiring connections to the various brushes and contact within the master switch 230 will be fully explained in connection with the circuit diagram for the entire machine.

Contact across each pair of brushes is effected by means of a rotatable contact carrier member 278 keyed to a hollow shaft 279 journalled in the lower portion 263 of the master switch 230. The rotatable member 278 is preferably made of some hard, dielectric material with a contact block 280 in its outer periphery of a width to exactly span a single pair of brushes. The shaft 279 is secured to the sleeve 252 in a manner that the contact block 280 in the member 278 lies in a plane exactly intermediate the two high contact roller arms 248 and 249 on the tilter 247 and thus effects a contact closure between the two brushes in a given brush block 266 corresponding to the closure of the contacts on the contact plates 242 and 243. A pulley 281 (Figure 9) is keyed to the hollow shaft 279 directly beneath the rotatable member 278.

Figure 13:
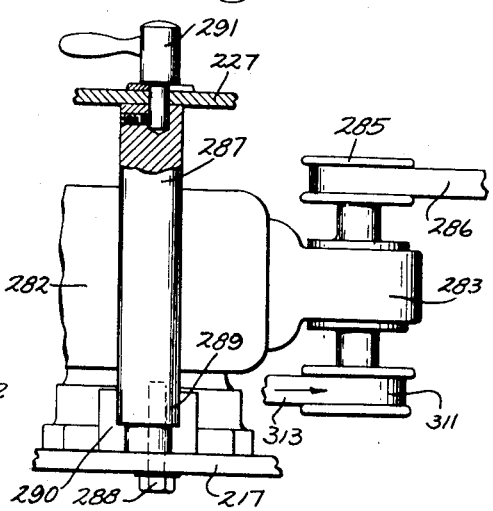
Figure 13 is a view of the eccentric mechanism controlling the belt slack of the driving motor in the control cabinet.

The master switch 230 is rotated, for automatic operation, by a small electric motor 282 movably mounted within the control set 215 (see Figures 8 and 9) and geared to a speed reduction unit 283. An output shaft 284 supports a pulley 285 which is connected to drive the pulley 281 by means of a belt 286. The motor 282 is swiveled on the horizontal panel 217 within the master control set 215 in a manner that the tension on the belt 286 may be released whenever the master control switch 230 is to be manually operated (Figures 8, 9 and 13). A vertically disposed cam 287 is journalled at the bottom end on a stud 288 fastened in the panel 217 and at the top end in the panel 227. The operating surface of the cam 287 is adapted to engage a slot 289 formed in an extending flange 290 integral with the motor 282. Rotation of the cam 287 to the extent of one half turn by means of a handle 291 attached to the protruding end thereof on the top panel 227 effects a movement of the motor 282 and the speed reduction unit 283 of sufficient magnitude to release the tension on the belt 286 and thereby permit it to slip on the pulleys 281 and 285.

With the motor 282 positioned to effect rotation of the master switch mechanism for automatic control, a friction clutch (not shown) built within the driving pulley 283 permits slippage while the master switch mechanism is halted in any one of its indexed positions, as will be later described. A switch 292 mounted on the top panel 227 (see Figure 7) is electrically connected to start or stop the motor 282.

Rotation within the master switch, during the automatic operation thereof, is stopped at any predetermined point by the effective abutment of a trip arm 293 against one of the eight stop pins 261 then extensibly positioned to engage it. Never more than four of the stop pins 261 are positioned for engagement at any one time. The pins N, E, S and W are used for rectangular cutting operations while the pins, NE, SE, SW and NW are used for diagonal cutting operations.

Each of the pin stations defines an indexing position of the switch at which a line feed or cross feed or concurrent operation to achieve diagonal feed is electrically directed.

The trip arm 294 (Figure 4) is pivotally mounted on a stud 295 for vertical action on an extending flange integrally formed on the upper end of the hollow shaft 279 and is balanced to normally lie in a horizontal plane against abutment pin 296. When arm 294 is horizontal, its end 297 will be engaged by any of the stop pins 261 which are predeterminately adjusted into its path, thereby effecting a desired sequence of movements of the machine. The extending end 297 of the arm may be raised to permit passage over a stop pin 261 by means of a shaft 298 centrally disposed in the hollow of the shaft 279 and actuated to effect a downward pressure upon the inner end of the arm. A half moon segment 299, adapted to fit a semi-circular pocket in the end of the arm 294, is fixedly attached to the rod 298. The inner end of the arm is biased toward segment 299 by a spring 300.

Downward movement of the rod 298 to effect a release of the trip arm 294 from a stop pin is brought about by a solenoid 301. The solenoid 301 is mounted on panel 217 and has an armature 302 engaged with the rod 298. A stop 303 is provided with an adjustable non-magnetic stem 304 which is adapted to abut the lower end of the rod 298 and serve as a guide for the armature 302. Whenever the solenoid 301 is electrically energized, a predetermined axial adjustment of the stem 304 serves to limit the travel of the armature and the actuating mechanism connected therewith to the minimum necessary to cause the trip arm 294 to rise above the stop pin 261. Any excessive movement tends to reduce the precision response necessary for a tracing operation. The solenoid 301 is especially designed to effect a rapid and positive action of the armature 302 and thereby reduce the time interval of the cyclic response of the master switch 230. The stem 304 also prevents any actual contact between the armature 302 and the stop 303 and therefore prevents any sluggishness in the release of the armature when the solenoid 301 is no longer electrically energized. A switch 305 (see Figure 7) enables the operator to connect the solenoid 301 into the electrical control circuit during the automatic operation of the master switch 230.

Figure 12:
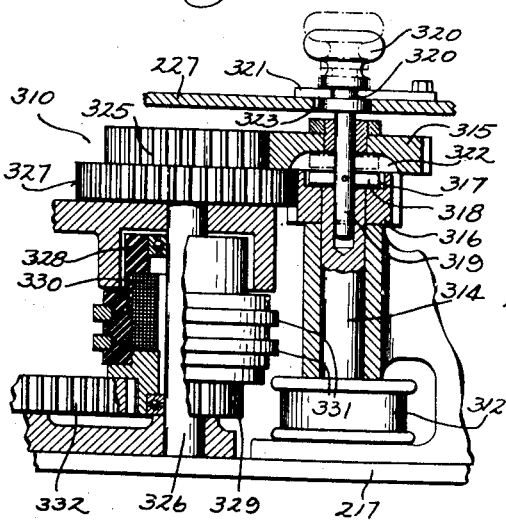
Figure 12 is a sectionally detailed view of the driving portion of the cross feed control mechanism contained in the control cabinet.

A cross feed timing mechanism 310, as shown in Figures 8, 9 and 12, mounted within the master control set 215, serves to control the time interval during which a clutch and brake set is energized to effect a cross feed movement. In the particular tracing machine herein shown and described, the cross feed movement originates in the controlled energization of the clutch and brake set 87 to effect an upwardly or downwardly movement of the spindle and tracer headstocks 70 and 71 on the column 52. The mechanism 310 is operably driven by the motor 282 and speed reduction unit 283. A pulley 311, keyed to the lower end of the output shaft 284 extending from the unit 283, is operably connected to drive a pulley 312 by means of a belt 313. Tension on the belt 313 is released while the cross feed timing mechanism 310 is not being used by manipulating the handle 291, as previously described in connection with the drive mechanism for the master switch 230. The pulley 312 is keyed to a vertically disposed shaft 314 mounted on the panel 217. A pair of gears 315 and 316 are on the top end of the shaft 314.

A slot 317 in the top face of the gear 316 serves to receive a key 318 pinned in a selector rod 319 axially disposed within the upper end of the shaft 314. The rod 319 extends through the top panel 227 of the master control set 215 and supports an operating knob 320. With the knob 320 in the full line position shown in Figure 12, gear 316 is keyed to shaft 314. The knob 320 is retained in this position by a latch bar 321 which engages the shank 322 of the knob 320. To enable the cross feed mechanism to be driven at a faster rate of speed, gear 315, rather than gear 316, must be keyed to shaft 314. The knob 320 is axially raised to the dotted position shown in Figure 12 after the latch bar 321 has been moved to a disengaging position, thereby raising the selector rod 319 and the key 318 into a slot 322 in the bottom face of the gear 315. The key 318 is retained within the slot 322 by swinging the latch bar 321 into engagement with the rod 319 beneath a flange 323 disposed thereon.

The high speed drive gear 315 is meshed with a gear 325 keyed to a vertically disposed shaft 326, while the slow speed drive gear 316 is meshed with a gear 327 likewise keyed to the shaft 326. An electromagnetic clutch 328 for connecting shaft 326 with gear 329 has a winding 330 energized by brushes and slip rings 331. Gear 329 meshes with gear 332. The solenoid clutch is designed to be instantaneously responsive to an electrical control impulse.

As shown in Figure 9, the gear 332 is keyed to a vertically disposed hollow shaft 333 rotatably journalled within the master control set 215. The upper end of the shaft 333 extends above the top panel 227 of the control set. A rotor 334 is keyed to rotate with the shaft 333 (see Figure 7). A double-throw switch 335 within the head end of the rotor 334 is actuated whenever an actuating button 336 extending from the side of the rotor engages a fixed stop 337 as the rotor 334 is rotated in a clockwise direction. When the rotor is rotated in a counterclockwise direction, an actuating button 338 extending from the rotor 334 serves to actuate the switch 335 as the button abuts a movable stop 339 clampingly mounted upon a dial ring 340. The length of the arc transcribed by the rotor 334 traveling from the movable stop 339 to the fixed stop 337 determines the time interval during which the clutch and brake set 87 is energized to effect a cross feed movement. Thus the time interval can be lengthened or shortened merely by adjusting the movable stop 339 to increase or decrease the distance between it and the fixed stop 337. The rotor 334 is driven in a clockwise direction whenever the coil winding 330 in the cross feed solenoid is energized to effect a driving connection from the motor 282 to the hollow shaft 333 and rotor 334. Counterclockwise rotation of the rotor 334 is effected by a coil spring 341 anchored to wind upon a drum 342 (see Figure 9) keyed to the shaft 333 and anchored at its other end to a fixed point within the control set cabinet. Mechanical actuation of rotor 334 in a clockwise direction overcomes spring 341. At the instant when the coil winding 330 in the cross feed solenoid is deenergized to effectively interrupt the driving connection, the tension previously created on the spring 341 is sufficient to effect the aforedescribed counterclockwise rotation of the shaft 333 and rotor 334. Electrical wires to the switch 335 extend through the hollow shaft 333 and a hollow cavity within the rotor 334. The electrical features in connection with the master control set 215 will be described in detail when the complete cycle of operation for rectangular and diagonal tracing operations is fully described.

The tracing mechanism 175 (Figure 17) containing the electrical tracer control means enclosed in the transparent casing 180 is operably disposed on the tracer headstock 71 for a unified axial movement with the inner spindle 118 operably mounted in the spindle headstock 70, as previously described. The tracer tool 57 must have the same shape as the cutter 58 in order to make precision tracing possible. The tool 57 is mounted on the outer end of the tracing rod 182. A ball 345 integrally formed at the center of the rod 182 is adapted to fit a socket 346 formed within the extreme end of the hollow casing 181 and is retained therein by a nut 347. A pliable washer 348 is adapted to fit over the top surface of the ball 345 underneath the nut 347 in a manner that any pressure placed upon the tracer tool 57 through contact with the pattern 55 will result in the free movement of the rod 182. In order to counterbalance the weight of the tracer tool on the end of the rod when the tracer is horizontal (as in this exemplification), a spring clip 349 fastened to the inner wall of the hollow casing 181 abuts the rod 182 near its innermost end. The sidewise pressure on the tracer rod as created by the clip 349, is adjustable by means of a set screw 350 in the casing 181. With the tracer mechanism 175 in a horizontal plane, as shown in Figure 1, the counterbalancing clip 349 is positioned on top of the tracer rod 182. If some means were not provided for counteracting the sidewide displacement of the rod 182 due to the weight of the tool 57 on its extreme outer end, an error would result in the duplication of the contour of any given pattern. Sufficient clearance is provided within the casing 181 and the nut 347 so that the movement of the rod 182 is not impeded. A collar 351 is pinned to the tracer rod directly beyond the end of the casing 181 which serves to protect the tracer mechanism 175 in the event that the contour of a given pattern is such that it might possibly strike the casing 181. As shown in Figure 17, the collar 351 would abut the pattern and cause an actuation of the rod 182 in a direction to effect a movement of the tracer mechanism away from the pattern.

A stationary terminal contact plate 352 is fixedly mounted within the casing 180 in axial alignment with the tracer rod. A movable contact carrier plate 353 is mounted on a ball and socket assembly 354 attached to the center of the stationary plate. Both of these plates are preferably made of a dielectric such as a plastic. A socket recess 355 in the hub of the plate 353 which extends into the casing 181 is adapted to receive a ball 356 integrally formed on the inner end of the tracer rod 182. A precision fit of the ball 356 within the recess 355 insures the transmission of the most minute movement of the tracer tool and rod to the movable plate 353. Rotation of the plate 353 is prevented by a pin 357 embeddedly fixed in the stationary plate and extending through an enlarged opening in the movable plate 353. Thus a set of four spring contacts evenly disposed on the stationary plate and individually designated as N, E, S and W are always in engageable alignment with four correspondingly spaced contacts disposed on the movable plate 353 and respectively individually indicated as N, E, S and W. The electrical connections between these contacts and the correspondingly designated contacts within the master control switch 230 will be more fully discussed in connection with the electrical circuit diagram. The maximum tilting movement of the contact plate 353 is determined by constant pressure placed at a given point on the periphery thereof. The pressure means includes a rod 358 extending through a recess in the plate 352 and biased against the plate 353 by a spring 359 abutting the opposite end thereof. The machine operator may adjustably vary the pressure of the spring 359 by turning a knob 360 attached to an adjusting screw 361 mounted on cover 362 and engaging the end of the spring 359. The screw 361 can be retained in any given position by the use of a locking nut 363 (see Figures 17 and 18).

Engagement of any of the four pairs of contacts on the plates 352 and 353 serves to electrically command a corresponding line feed or cross feed movement. The movement of the tracer tool 57 and the tracer mechanism 175 toward or away from a pattern 55 is effected by the closure of another pair of electrical contacts. This movement will hereinafter be referred to as the "in-out" movement; the "out" movement suggesting a movement of the tracer tool 57 away from the pattern and an "in" movement suggesting the movement of the tracer tool toward the pattern.

A conical socket machined into the end of a rod 365 attached to the ball of the ball and socket assembly 354 serves to retain a ball 366. Another conical socket machined into the end of an adjusting screw 367 in the center of a contact arm 368 is likewise disposed to receive the ball 366. The arm 368, as shown in Figure 17, is fulcrumed at the extreme left end on a pin 369 horizontally fixed within the casing 180. Rotation of the adjusting screw 367 tends to raise or lower the arm 368. The screw 367 may be locked in any desired position by a locking nut. A double ended electrical contact 370 is embedded in an insulated block attached to the free end of the pivoted contact arm 368. An adjustable and yieldably mounted "out" contact 371 is carried by the cover 362 for engagement by one face of the contact 370 while an "in" contact 372 is appropriately mounted within the casing 180 for engagement by the opposite face of the contact 370.

A vibrator acts on the tracer contacts, or one of them, to move it to and from the other to sensitize tracer response. In this exemplification, vibration of the contact arm 368 is effected by means of a solenoid 373 attached to the stationary contact plate 352. An axially adjustable armature 374 is in axial alignment with the solenoid 373 and connected with arm 368. The electrical excitation of the solenoid 373 will cause the armature 374 and the arm 368 attached thereto to be magnetically drawn toward the solenoid 373 and, consequently, toward the "in" contact 372. Since the magnetic action occurs sixty times in each second, the resulting vibration tends to favor the engagement of the "in" contact and thereby favor the instigation of an electrical impulse tending to effect an "in" movement. It also eliminates any question as to adequacy of contact between the contact points 55 and thereby insures a precise duplication of the said pattern.

During the remainder of each cyclic electrical impulse when the solenoid 373 is not energized, the contact 370 is free to engage the "out" contact 371 if it is urged to do so through an appropriate lateral or axial pressure on the tracer tool 57. Sufficient tension is maintained on the arm 368 by a spring 375 abutting the arm and the inside face of the cover 362 to maintain a constant contact between the rod 365, the ball 366 and the arm 368. An actuating pin 376 connected to the contact arm extends through the center of the spring 375 and an opening in the cover 362. Since the tracer mechanism 175 is the nucleus of the machine, all adjustments therein must be extremely accurate in order to insure the exact electrical interpretation and transmission of the slightest variance in the contour of the pattern which is being duplicated.

As the tracer point is deflected either axially or laterally by contact with the pattern, it is desirable that it be returned to center as soon as the pressure is relieved. The spring 375 provides some bias tending to center the tracer but, obviously, the real function of this spring is to bias the lever 368. A strong bias on the tracer, however effected, would render it insensitive. Yet there is a zone, after deflection has occurred, when strong pressure on the tracer in a direction toward its central position will render possible a more faithful reproduction than would otherwise be the case.

The electromagnet 373 provides this strong bias intermittently with the frequency of the half cycle whereby it is energized. If the tracer is in the zone where a strong bias will center it, the electromagnet effects this result. Since tracing accuracy is promoted by having the tracer at all times as nearly centered as possible, and also by overcoming any sluggishness in return, the magnet performs a very desirable function.

At the same time, the centered tracer is intermittently, with the frequency of the half cycle which does not reach magnet 373, almost completely free of bias and hence exceptionally sensitive. The vibratory action on the tracer may be regarded as an arrangement whereby the point is made to feel out with high frequency and great sensitivity its approach to the work.

As a preliminary to discussing the various types of operation of the tracer controlled machine tool and the pertinent electrical control associated with each of the operations, it is deemed advisable to consider the effect of the relative movements of the tracer tool and cutter in relation to the pattern and workpiece. The relative movements in two planes, namely the up and down movement of the spindle headstock 70 and tracer stock 71 and the longitudinal movement of the table, are referred to in terms of the four cardinal points of the compass. Thus relative upward movement of the tracer and cutter upon the pattern and workpiece, respectively, is referred to as "north" and is effected by the upward movement of the spindle headstock 70 and tracer headstock 71 upon the column 52 while relative downward movement of the tracer and cutter upon the work piece, respectively, is referred to as "south" and is effected by the downward movement of the spindle headstock 70 and tracer headstock 71 upon the column 52. The clutch of the clutch and brake set 87 which drives the headstocks 70 and 71 upwardly is referred to as the "N" clutch, while the clutch in the set 87 which effects the downward or south feed movement of the headstocks is known as the "S" clutch.

Rightwardly relative movement of the tracer and cutter upon the pattern and workpiece, respectively, is referred to as "east," while the leftwardly relative movement of the tracer and cutter upon the pattern and workpiece, respectively, is referred to as "west." That clutch of the clutch and brake set 62 which effects the rightward relative movement is known as the "E" clutch, while the clutch which effects the leftward relative movement is known as the "W" clutch. East and west relative movements in the particular embodiment herein discussed originates in the movement of the table 51 supporting the pattern and workpiece, rather than in the movement of the tracer and cutter. Therefore, in actuality, the "E" clutch is effecting a movement of the table to the left or west and the "W" clutch is effecting a movement of the table to the right or east. However, it is best to think of all of these movements in terms of their relativity to one another. Thus the clutches are named to correspond to the relative movements which they accomplish and not the actual movements, since the latter will vary with the machine tool to which the present principle of tracing is applied. To simplify references to the various contacts in the tracer mechanism 175 and in the master control switch 230 which excite the individual clutches in the clutch and brake sets, these contacts are labeled to correspond to the clutches which they govern.

In each of the three clutch and brake sets 62, 87 and 185, a brake is incorporated to impart braking action to the rotative movements originating therein. Half cycle current, opposite to the half cycle current used to energize the clutches, is used to energize the brake windings within the brake housing. The brake is energized every half cycle without requiring tracer or other control, as distinguished from the clutches, which are potentially subject to the alternate half cycle but may or may not be energized, depending on the controls.

The half cycle current is taken from the brush 225 of the cycle separator 216 and is conducted through the line 408 to a resistance 501. This resistance is connected to the brake B1 with the circuit being completed through a connection with the common return line 402. Since the half cycle current used to energize the brake B1 is opposite the half cycle current used to energize the clutches, the energization of the brake will occur alternately to any energizations of either of the clutches. Thus a braking action will be imparted to the rotating output mechanism of the clutch and brake set 62 in between the driving actions originating in this set. If, for example, a sixty cycle alternating current is fed into the cycle separator 216, the half cycle current impulses used to energize the brake each effects such an energization for a period of $1/120$ of a second. Thus when the W clutch is energized to effect a W movement, a cyclic brake energization would interrupt this movement each and every $1/120$ of a second. The brake action need not necessarily stop movement completely except when the braking operations exceed clutch operations in number. The braking operations are so short that, with appropriate brake design, the brake may, if desired, merely regulate movement to prevent overrun, the complete cessation of movement being effected the instant a clutch operation fails (due to an open circuit at the tracer) to intervene between successive brake operations. Thus, sensitivity of progress, rather than intermittent progress, results.

The brake $B_2$ in the clutch and brake set 87 and the brake $B_3$ in the clutch and brake set 185 may operate like the brake $B_1$ in the clutch and brake set 62 previously described. All three brakes accomplish the same purpose in their respective clutch and brake sets, namely, to interpose a braking action between each driving action originating therein. The same half cycle current is used to energize the three brakes. Thus the current is taken from conductor 408 through a conductor 502 and a resistance 503 to the brake $B_2$ and the circuit is completed through a connection with the return line 402. Likewise, the half cycle current for the brake $B_3$ is taken from the conductor 408 through a conductor 504 and a resistance 505. The circuit is completed through the line 402. The half cycle current serving the brakes $B_1$, $B_2$ and $B_3$ flows continuously from the cycle separator 216 to the respective brake windings and effects a unified brake action in each of the clutch and brake sets throughout the entire period in which the machine is operating. Even though a relative movement is not being originated in one of the clutches of a given clutch and brake set, the brake will continue to function and will serve to lock the set and the driving mechanism associated therewith.

In order to insure precisive response within the clutches and brakes of a clutch and brake set, adjustable resistances were introduced into the circuits leading to the three units which comprise a clutch and brake set. Thus in the clutch and brake set 62, resistances 448, 496 and 501 were included in the circuits leading to the E clutch, the W clutch and the brake $B_1$, respectively. Each of these resistances may be manipulated until the resulting action of the clutch or brake connected thereto is identical to the action of the other two units in the set. Likewise, in the clutch and brake set 87, the resistances 428, 467 and 503 were introduced for the same reason. And in the clutch and brake set 185, the resistances 482, 485 and 505 were introduced into the "out" clutch circuit, the "in" clutch circuit and the brake $B_3$ circuit.

The description to this point has been confined to the mechanical structure of the machine, together with the mechanical structure of the control mechanisms used to effect the precision control of said machine. Since the control features are of primary importance in this patent, it is deemed advisable to descriptively tie the various structures of the entire machine together by assuming a given tracing operation and following each control action in its proper sequence to completion. Therefore, the following sequence of a rectangular tracing operation will be assumed, namely: A line feed movement to be accomplished from south to north, indicated as S to N, and from north to south, indicated as N to S, together with a cross feed movement to the east, hereinafter referred to as an E cross feed movement. One complete cycle of operation will be described. Thus a series of rectangular cutting paths will be created across the operating face of the pattern and workpiece by predeterminately adjusting the master switch 230 to effect the aforedescribed sequence of operation. The electrical circuit diagram, as shown in Figure 24, indicates all of the electrical drive mechanisms and controls.

Current is obtained from an alternating current power source L1 and L2 through a pair of supply lines 401 and 402. A switch 403 on the top panel 227 of the master control set 215 is closed to start the synchronous motor 219 driving the cycle separator 216 and to supply current to the center brush 223 of the separator. One terminal of the switch 403 is connected to the supply line 401 while the other terminal is connected to a wire 404 which extends to the motor 219 and the brush 223. The synchronous motor circuit is completed by a wire 405 connected to the said motor and to the supply line 402. As the motor 219 reaches synchronous speed, the contact drum 218 of the cycle separator 216 will be driven at the same speed and the three brushes 223, 224 and 225 riding the contact strips on the drum may be shifted to bring the current into synchronism. When this adjustment has been properly made, the half cycle current output at each of the two brushes 224 and 225 will be exactly opposite to the other, with the division of the current occurring exactly at each zero current value in order to minimize brush arc.

Assuming that the pattern 55 and workpiece 56 have been properly fastened to the upright fixture 54 clamped on the horizontally disposed table 51, as is shown in Figure 1, and that the tracer headstock 71 has been appropriately spaced in relation to the spindle headstock 70, the machine is now ready for the rectangular tracing operation aforedescribed. The necessary connections at the master control switch 230 are presumed to have been made to effect an "N" and "S" line feed movement and an "E" cross feed movement, as indicated in Figure 24 and will be fully described in connection with the electrical circuit diagram. A switch 407 connected into the supply line 401 and mounted on the top panel 227 of the master control switch is closed to start the motors 66, 88 and 186, each of which is mechanically connected to drive a clutch and brake set as previously described. The circuit to each of these motors is completed through a connection with the supply line 402. With these three motors running, tri-directional movements between the table 51, the spindle and tracer headstocks 70 and 71, and the spindles 105 and 118 and tracer mechanism 175 are possible. However, each direction of movement is dependent upon the electrical excitation of the respective clutch set that is governed by the electrical tracer mechanism 175 and the master control set 215.

The half cycle current emanating from the cycle separator brush 224 is conducted through the line 406 to each of the four contacts N, E, S and W on the movable contact plate 243 of the master control switch 215. Since a rectangular tracing operation is to be performed, the four brush blocks 266 at the N, E, S and W positions and the four stop pins 261 associated therewith are operably positioned within the switch 215, while the brush blocks at NE, SE, SW and NW and their respective stop pins are withdrawn as indicated in Figures 7, 8 and 24. Thus the brushes 273 and 274 in each of the operably disposed brush blocks 266 are then disposed to engage the rotatable member 273 and, consequently, the contact block 280 embedded on the periphery thereof.

If the rectangular tracing operation is begun at the start of the N line feed movement, a rotative movement within the switch 215 will have effected an engagement of the trip arm 294 with the N stop pin 261. The contact block 280 on the rotatable member 278 is then positioned to permit an electrical flow from the brush 273 to the brush 274 at the N position. Half cycle current for the control is taken from the brush 225 on the cycle separator 216 and conducted by a line 408 and a line 409 to an insulated, circular bus bar 410, horizontally disposed on the panel 217. An appropriate flexible connection from the bus bar 410 to each of the eight brushes 273 retained in the brush blocks 266 permits a free longitudinal movement of the individual brush blocks. With the contact block 280 spanning the N station brushes 273 and 274, control current is permitted to flow from the brush 273 to the brush 274 connected to a jack 411 embedded in the top surface of the master control set 215. A jumper wire 412 with appropriate plugs attached to each end permits the passage of the control current from the jack 411 to an indexing jack 413 in the N jack station. This jack is connected to an indexing switch 414 by a conductor 415. The indexing switch 414 is mounted on the tube 178 in a manner to move with the tracer mechanism 175 and serves to electrically control the extreme limits of the line feed movement. During the N line feed movement, a contact bar 416 mounted on an insulated actuating rod 417 within the switch 414 is spring biased to a nonengaging position.

When the master control switch 230 is positioned to effect a N line feed movement, the N position electrical contacts on the contact plates 242 and 243 of switch 215 will be closed. This closure is effected by the action of the rotatable tilter 247 upon the movable contact plate 243. Closure of these contacts permits a flow of half cycle current from the conductor 406 through the said contacts to a conductor 420. A pair of plugs 421 and 422 are disposed adjacent the N jack station on the top panel 227 of the control cabinet. The conductor 420 is connected to each of the plugs 421 and 422 in a manner to permit a withdrawal of the said plugs from their respective positions and the subsequent insertion into the various jacks disposed about the master switch 230. The flexible plug moving means, as suggested in Figure 9, provides for a counterweighted pulley 423 operably retained in the slack loop of the conductor. Thus when a plug is released, the excess wire on the surface of the control cabinet is withdrawn into the interior of the cabinet.

N line feed movement is effected through the energization of the N clutch in the clutch and brake set 87. When the plug 421 is inserted into either one of two jacks 424 or 425, clutch current is permitted to flow through a conductor 426 to the normally closed N' contacts on the contact plates 352 and 353 within the tracer mechanism 175. The current flows from the N' contact on the stationary plate 352 through a conductor 427 to a variable resistance 428 and thereafter to one terminal of the N clutch in the clutch and brake set 87. The other terminal of the N clutch is connected to the common return line 402. The electrical energization of the N clutch serves to magnetically lock the clutch housing and disc together as was fully described in a copending application, Serial No. 409,095, filed August 30, 1941. During the intervals in which the N clutch is thus energized, the motor 88 driving the said clutch housing effects a clockwise rotation of the shaft 75 and, consequently, effects an upward movement of the spindle and tracer headstocks 70 and 71. Thus the tracer tool 57 and the cutter 58 are motivated across the face of the pattern 55 and workpiece 56 in an upwardly or northwardly direction. Such a movement will hereinafter be referred to as a N line feed movement.

The limits of line feed travel are predeterminately set to keep the tracer tool and cutter in constant contact with the pattern and workpiece. Any excess travel beyond the edges of the pattern and workpiece, commonly known as over travel, represents wasted energy and time since nothing is accomplished during this interval. In the present machine, this excess travel has been practically eliminated. Due to the size and shape of the patterns which can be accommodated on this machine the usual method of effecting a line feed reversal, namely, the positioning of a trip dog or switch to function at the most extreme limit of travel for the given pattern, was not advisable. It is quite evident that this type of reversing means allows for excessive amounts of overtravel especially in those cases in which the edges of a pattern vary greatly. In the present case, the reversal of the line feed movement is accomplished by positioning the above mentioned indexing switch 414 on the tube 178 in a manner to move with the axial movement of the tracer mechanism 175, as shown in Figure 3.

Two stops 431 and 423 are clampingly attached to an upwardly extending flange 433 on the top edge of the tracer headstock 71 and are predeterminately positioned to engage the forward or rearward ends of the actuating rod 417, respectively, extending from both ends of the reversing switch 414. The position of the stop 431 is determined from the maximum "in" limit of travel of the tracer tool 57 for a given pattern. In the majority of cases this will be almost to the vertical clamping surface of the fixture 54. The stop 432 is positioned to engage the rearward end of the actuating rod 417 of the switch 414 at a point representing the maximum "out" limit of travel of the tracer tool and, consequently, the tracer mechanism 175 for a given pattern. If, as is suggested in Figure 1, the contour of the pattern is such that the limits of the line feed movement would be determined from two extreme "in" limits of travel of the tracer tool 57, it would merely be necessary to adjust one stop 431 to actuate the reversing switch 414 at both limits of line feed movement. Thus for the given tracing operation, the limit of the N line feed movement would be determined from the maximum "in" travel at the top edge of the pattern. At this point, the stop 431 actuates the rod 417 and consequently effects a closure of the contact bar 416 across the terminals within the indexing switch 414 and permits the control current to flow from the line 415 through the switch 414, a line 434, and a line 435 to the tripping solenoid 301. The circuit to the solenoid is completed through a line 436, a switch 305, and a line 437 to the common return line 402. The switch 305 on the panel 227 of the control set 215 is closed during all types of automatic tracing operations but is opened during manually controlled tracing operations. The energization of the solenoid 301 causes the rod 298 within the master control switch 230 to be magnetically drawn downward until the extending end 297 of the trip arm 294 is raised sufficiently to pass over the top of the N stop pin.

The master control switch 230 is now set to automatically index to the next station, namely, the E cross feed station, and instigate an E cross feed movement. Immediately upon the release of the trip arm 294, the said arm is caused to rotate clockwise. The motor 282 and the speed reduction unit 283 together with a builtin pulley arrangement, as previously described, serve to effect the indexing rotation of the trip arm 294 and the other rotatable mechanisms within the master switch 230. The motor 282 is started by closing the switch 292 on the top panel of the control set 215 and remains in operation during the entire tracing operation. Closure of switch 292 permits a current flow from supply line 401 through the said switch and a conductor 438 to the motor 282. The circuit is complete through a connection with the wire 405. Slip clutches (not shown) within the driver pulley 285 permit the motor 282 to continue to operate even though the rotating mechanism within the master control switch is locked against rotation. Thus the trip arm 294 within the master switch 230 (see Figure 14), the rotatable member 278 and the tilter 247 will rotate simultaneously until the extending end 297 of the arm 294 strikes the E stop pin 261. When the contact 280 on the rotatable member 278 is rotated, the control circuit through the N brush 273, the contact 280 and the N brush 274 is broken and consequently the solenoid 301 is no longer energized even though the contacts of the reversing switch 414 remain closed. As soon as the magnetic attraction upon the rod 298 is removed, the spring 300 forces the trip arm 294 back into its normal horizontal position.

When the rotatable mechanism within the master switch 230 is stopped at the E position, an E cross-feed movement is started in the following manner: With the switch in this position, the contacts at the E position on the stationary plate 242 and on the movable plate 243 will be closed. Thus the half cycle current is free to flow from the line 406 through the E contacts to a line 441 and to two plugs 442 and 443. These plugs are directly connected to the line 441 and are disposed on the opposite sides of the E jack station on the top panel of the master control set 215 in a manner that they may be extensibly drawn out of the cabinet and plugged into any of the jacks about the master control switch as the occasion may demand. The plug 443 is plugged into a jack 444 in the E jack station. The jack 444 and a jack 445 are connected together to a line 446 which in turn is connected to the E' contact on the movable plate 353 of the tracer mechanism 175. Since the E' contact on the plate 353 engages the E' contact on the plate 352, the current flows from the line 446 to a line 447 and a resistance 448 to one terminal of the E clutch in the clutch and brake set 62. The E clutch circuit is completed through a connection with the common return line 402. With the clutch thus energized, the motor 66 will effect a clockwise rotation of the table screw 63 and thereby effect a relative E cross-feed movement of the tracer and cutter over the operating face of the pattern and workpiece respectively.

The time interval during which the E cross-feed movement continues is determined by the cross-feed timing mechanism 310. The distance of cross-feed travel is generally slightly less than the diameter of the operating tip of the tracer tool 57 or cutter 58. A slight overlap is permitted in order to minimize the possibility of ridges along the sides of each longitudinal path of travel on the finished workpiece.

When the contact block 280 on the periphery of the member 278 in the master switch is retained at the E position thereof, the control current can pass from the line 409, bus bar 410 and an E brush 273, through the block 280 to an E brush 274 and jack 449 mounted in the top panel 227 of the control set 215. A jumper wire 450 equipped with a plug at each end serves to carry the control current from the jack 449 to an E jack 451 in the E jack station. Thereafter the control current flows through a line 452 to the common terminal and contact plate 453 of the double throw switch 335 mounted within the rotor 334 of the cross-feed timing mechanism 310 (see Figures 7, 9 and 24). With the rotor 234 of the timing mechanism 310 in the position shown in Figure 24, the actuating button 338 is depressed against the movable stop 339 which in turn forces the contact plate 453 against a terminal 454. The normal position of the rotor 334 is adjacent the stop 339. The control current will flow from the line 450 through the switch 335 and a line 455 to one terminal of the coil winding 330. The circuit to the coil winding is completed through a connection with the common return wire 402. The electrical energization of the winding 330 causes the rotor 334 of the cross-feed timing mechanism 310 to be rotatively driven in a clockwise direction. The power source for this rotation originates in the motor 282 and is transmitted to the rotor 334 in a manner previously described herein. Since the switch 335 is of a snap type, the contact plate 453 will remain in contact with the terminal 454 even though the actuating button 338 is no longer depressed. The rotor 334 will continue its rotation until the actuating button 336 thereon strikes the fixed stop 337 and causes the plate 453 to break contact with the terminal 454 and to make contact with a terminal 456 within the switch 335. At that instant, the circuit to the winding 330 is broken and therefore the clockwise rotative driving force is removed from the rotor 334 and the rotation thereof is reversed. Counterclockwise rotative force is imparted to the rotor 334 by the action of the coil spring 341 upon a drum 342 keyed thereto. The completion of the electrical circuit from the line 452 to the terminal 456 of the switch 335 permits the control current to flow into a line 457 and the line 435 to the tripping solenoid 301. The plate 453 remains in contact with the terminal 456 during the counterclockwise movement of the rotor 334, and until the actuating button 338 again strikes the stop 339, at which time the switch 335 is reset for the next cross-feed timing cycle. The length of the arc prescribed by the rotative movement of the rotor 334 determines the length of the cross-feed movement. Thus the movable stop 339 must be predeterminately adjusted on the dial ring 340 for a desired cross-feed movement.

Actuation of the armature 302 within the solenoid 301 causes the extending end 297 of the trip arm 294 to be raised upwardly over the top of the E stop pin 261 and thereby permits the arm and the rotative mechanism associated therewith to index in a clockwise direction. The switch mechanism is rotated until the extending end of the arm 294 engages an S stop pin at which time an S line feed movement will be instigated. As the mechanism is rotated to the S position, the rotation of the tilter 247 causes the E contacts on the contact plates 242 and 243 to open and the S contacts thereon to close. Thus the half cycle current will flow from the line 406 through the S contacts on the plates 242 and 243 and a line 460 to a pair of S plugs 461 and 462 attached thereto. The plugs are extensibly retained on the top surface of the panel 227 of the master control set 315 and either one of the said plugs may be inserted into any of the jacks surrounding the master control switch 230. Counterweighted pulleys 423 as previously described in connection with the plugs at the N station, serve to normally retract into the cabinet the wire 460 to which the plugs 461 and 462 are attached.

The plug 461 is inserted into a jack 463. The jack 463 and a jack 464 are each connected to a conductor 465 which serves to carry the half cycle current to the S' contact on the tracer contact plate 353. Since the S' contacts on the contact plate 352 and 353 of the tracer mechanism 175 are normally closed, the current can flow through a conductor 466 and a resistance 467 to a terminal of the S clutch in the clutch and brake set 87. The circuit to the S clutch is completed through a connection with the common return line 402. The electrical energization of the S clutch permits the motor 88 to effect a clockwise rotation of the vertically disposed screw shaft 75. Thereupon the spindle and tracer headstocks 70 and 71 operably connected therewith are driven in a downwardly or S direction. Thus the tracer tool 57 and the cutter 58 are operably moved in a downwardly or S direction across the face of the pattern 55 and workpiece 56, respectively.

A control circuit is established with the master control switch automatically retained at the S position as follows: The half cycle control current emanating from the brush 225 of the cycle separator 216 flows through the lines 408 and 409, the circular bus bar 410, and the S brush 273 through the contact 280 to the S brush 274 and a jack 469 connected thereto. Plugs attached to each end of a jumper wire 470 inserted into the jack 469 and a jack 471 in the S jack station conduct the control current from the S brush 274 to a conductor 472 and thence to the indexing switch 414. At the beginning of the S line feed movement the actuating rod 417 was still in contact with the stop 434. A feed back circuit is not created because switch 414, instead of directly energizing the indexing solenoid 301 acts through a step by step relay 650 in which the circuit to solenoid 301 is normally open, being closed but once in each operation of the limit switch 414.

After sufficient S line feed movement, the actuating rod 417 of the switch 414 is no longer engaged with the stop 434 and spring pressure on the rod will cause it to return to a neutral position and be reset for the following actuation. As the spindle and tracer headstocks 70 and 71 reach their prescribed downward limit of travel, the reversing switch 414 moving in unison with the tracer mechanism 175 will again be actuated. Since the contour of the pattern 55 (see Figure 1) is such that the extreme S limit of line feed movement is determinable from an extreme "in" movement of the tracer tool operating on the pattern, the actuating rod 417 will again meet the stop 431 and cause the contact bar 416 to close a circuit through the switch. Thus the control current will flow from the conductor 472 through the switch 414, the line 434 and 435 to the solenoid 301. The actuation of the rod 298 by the solenoid 301 once again causes the arm 294 to trip over the S stop pin 261 and allows the mechanism within the master control switch 230 to index in a counterclockwise direction. As soon as this indexing rotation is begun, the movement of the tilter 247 will cause the S contacts on the contact plates 242 and 243 within the switch 230 to open. Thus the circuit to the S clutch in the clutch and brake set 87 is broken and consequently the S line feed movement is instantaneously halted. Automatic clockwise rotation within the master control switch will continue until the extending end 297 of the trip arm 294 meets with the W stop pin 261. With the control switch in this position, the W contacts on the plates 242 and 243 therein are closed so as to permit the half cycle current to flow from the line 406 through the W contacts and a conductor 475 to a pair of plugs 476 and 477. These two plugs are extensibly retained on the top surface of the panel 227, as previously described, and may be withdrawn from the control cabinet and inserted into any of the jacks in the four jack stations about the master control switch. In order to maintain the cross-feed movement in the same direction, namely to the east, the plug 477 is inserted into the jack 445 in the E jack station. Thus the current will flow from the conductor 475 to the conductor 446, the E' contacts in the tracer mechanism 175, the conductor 447 and the resistance 448 to the E clutch in the clutch and brake set 62. Thus the E clutch will be energized to effect a clockwise rotation of the table screw 63 and consequently an E cross-feed movement.

With the master control switch in the W position, the control current will flow from the line 409 and the circular bus bar 410 through the W brush 273, the contact block 280 and the W brush 274 to the jack 478. A jumper 479 having a plug attached to each end is employed to complete the circuit from the jack 478 to a jack 480 in the W jack station. Thus the current can flow to a conductor 481 and the conductor 452 to the switch 335 mounted in the rotor 334 of the cross-feed timing mechanism 310. Through the mechanism thereof, as previously described, after a predetermined interval, the control current from the conductor 452 is diverted through the line 457 and 435 to the tripping solenoid 301 which controls indexing. The resulting rotation of the master control will cause the W contacts on the contact plates 242 and 243 of the control switch to open and therefore break the circuit to the E clutch in the clutch and brake set 62. The E cross-feed movement is instantly stopped. One complete rotation of the mechanism within the master control switch 230 has now occurred with four intervening stops, namely, a stop at N, E, S and W positions to effect the selected rectangular tracing cycle. The switch will be again automatically halted in the N position and an N line feed movement will be repeated as previously described.

The third dimensional movement hereinafter referred to as the "in-out" movement comprises the axial feed movement of the tracer tool 57 and cutter 58 as required to follow the contour of a given pattern. This movement is continually functioning in one direction or the other as the tracer tool and cutter follow a prescribed rectangular or diagonal cutting path. Thus in the given case the "in-out" movement is being effected while the prescribed N or S line feed movement and the E cross-feed movement is occurring.

The electrical circuit relative to the "in-out" clutch in the clutch and brake set 185 is also diagrammatically shown in Figure 24. Half cycle current from the cycle separator 216 is carried through the conductor 406 to the double-faced contact 370 disposed on the contact arm 368 within the tracer mechanism 175 and to the solenoid 373 mounted on the stationary contact plate 352 in the said tracer mechanism (also see Figure 17). If the contour of the pattern is such that a rise on the surface thereof demands an outward movement of the tracer tool and mechanism 175, the increased axial pressure on the tip of the tracer tool 57 will cause movement in the tracer mechanism of sufficient magnitude to bring the electrical contact 370 on the arm 368 into engagement with the "out" contact 371. The "out" contact is connected to a conductor 481 which in turn is connected to a resistance 482 and thereafter to the "out" clutch in the clutch and brake set 185. Thus at the given instant when the contacts 370 and 371 are together, the half cycle current will flow from the line 406 through the conductor 481 and the resistance 482 to the "out" clutch. The circuit is completed by a connection with the common return line 402. Energization of the "out" clutch will permit the motor 185 to effectively drive the vertically-disposed splined shaft 187 and consequently cause the tracer mechanism 175 and the spindle 118 to be retracted and thereby cause the tracer tool and the cutter 58 to be drawn away from the pattern 55 and the workpiece 56, respectively. It is quite evident that a very small amount of movement is sufficient to relieve the pressure on the tracer tool and mechanism 175 and thus break the engagement of the contacts 370 and 371. This would immediately open the circuit to the "out" clutch in the clutch and brake set 185 and stop the "out" movement of the tracer and spindle mechanism.

The function of the solenoid 373 is to magnetically attract the armature 374 fixedly attached to the contact arm 368 in the tracer mechanism 175. Since the half cycle current from the line 406 is used to energize the solenoid 373, the magnetic attraction created thereby is cyclic in nature. The arm 368 will be drawn downwardly during the 1/120 of a second in which the current is flowing and will be released during the next 1/120 of a second when the current is not flowing. The circuit for the solenoid 373 is completed by the connection with a conductor 483 which in turn connects with the common return line 402. During the interval in which the solenoid 373 is energized, the contact 370 on the arm 358 is brought into engagement with the "in" contact 372 in the tracer mechanism 175. The half cycle current is now free to flow from the line 406 through the contacts 370 and 372 to a conductor 484 and a resistance 485. This resistance is connected to one terminal of the "in" clutch in the clutch and brake set 185. The circuit thereto is completed by a connection with the common return line 402. When the "in" clutch is energized, the clutch housing and disc are magnetically locked together to permit the motor 186 to drive the splined shaft 187 and consequently effect an "in" movement of the tracer tool and mechanism 175 and the inner spindle 118 and the cutter toward the pattern and workpiece, respectively.

The rectangular tracing operation which has just been described represents but one of the possible rectangular tracing operations which can be predeterminately set by the operator. An operation which closely conforms to the tracing operation aforedescribed is one in which the line feed connections are set to provide N and S line feed movement, as shown in Figure 24, but with the cross feed connections reversed to provide a cross-feed movement to the west.

Figure 25:
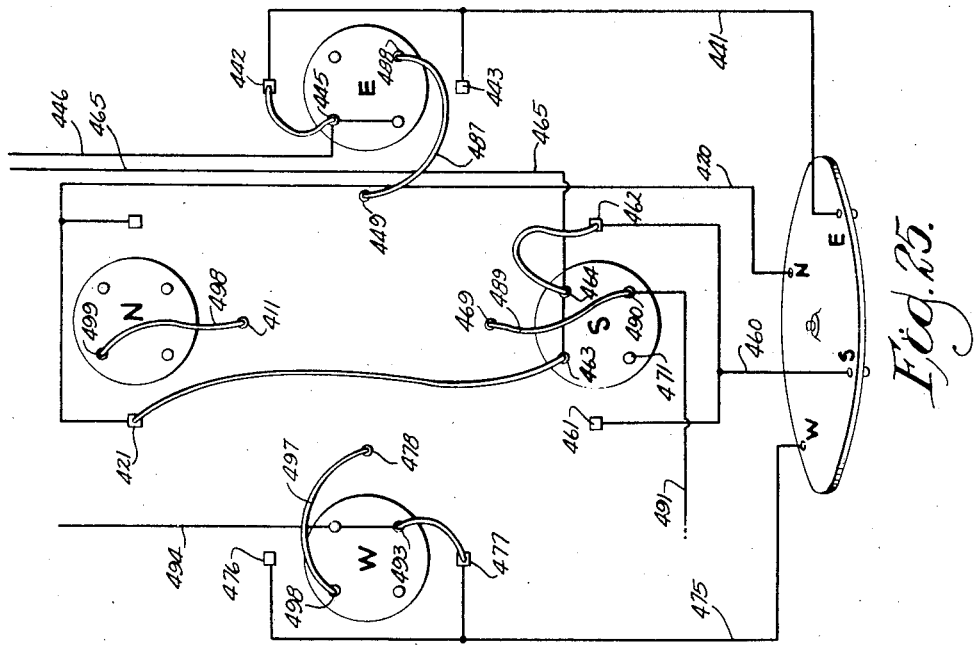
Figure 25 is a diagrammatic showing of a portion of the wiring diagram shown in Figure 24 together with the necessary jumper connections to effect another rectangular tracing operation.

A third rectangular tracing operation which can be predeterminately set on the automatically controlled master control switch covers the condition in which it is desirable to have a relative line feed movement to the east, hereinafter referred to as an E line feed movement, a relative line feed movement toward the west, hereinafter referred to as a W line feed movement, together with a cross-feed movement to the south, hereinafter referred to as an S cross-feed movement. Only that portion of the master control switch is diagrammatically shown in Figure 25 which is necessary to depict the jumper wire and plug connections to accomplish such a movement. The operation and the agencies employed are essentially the same as those above described except that the E-W movement has become the line feed and the N-S movement the cross-feed.

A fourth automatic rectangular tracing cycle may be predeterminately set on the master control switch 230. This cycle would consist of an E and W line feed movement and an N cross-feed movement. The necessary connections to effect the E and W line feed movements would be identical to those shown in Figure 25, while the connections to effect the N cross-feed movement would necessarily be reversed.

Diagonal tracing may be desirable under certain conditions. For example, it may be necessary to take a rough cut using a rectangular tracing set-up, as was previously described, and a finish cut using a diagonal tracing set-up or vice versa. Or the contour of the pattern may be such that the diagonal tracing is more desirable. In this case, two clutches are simultaneously energized in either of two clutch and brake sets to effect a resultant diagonal movement of the tracer tool and cutter across the operating face of the pattern and workpiece, respectively. Thus, for example, if the N and the E clutches in the brake sets 87 and 62 were simultaneously energized, a resultant diagonal movement to the northeast would be accomplished. The automatic control by the master control switch 230 can be predeterminately set by the operator to effect diagonal movements upon a given pattern without any further adjustment during the entire tracing operation.

For example, a diagonal tracing cycle may be assumed to comprise an NE and SW line feed movement and an SE cross-feed movement. The four diagonal brush blocks NE, SE, SW and NW are moved to an operating position in the master control switch while the four brush blocks N, E, S and W are withdrawn from their engaging position with the rotatable member 278. The switches 292, 403 and 407 are closed to start the master switch motor 282, the cycle separator 216 and the three clutch set motors 66, 88 and 186, respectively. If the diagonal tracing operation is started with the trip arm 294 abutting the NE stop pin within the master switch, an NE line feed movement will occur. The tilter 247 engaging the movable contact plate 243 within the master control switch 230 will then be positioned to retain both the N and E contacts on the contact plates 242 and 243 simultaneously in a closed position. Thus the half cycle current will flow from the cycle separator 216 through the line 406 and the N and E contacts to the conductors 420 and 441, respectively.

Figure 26:
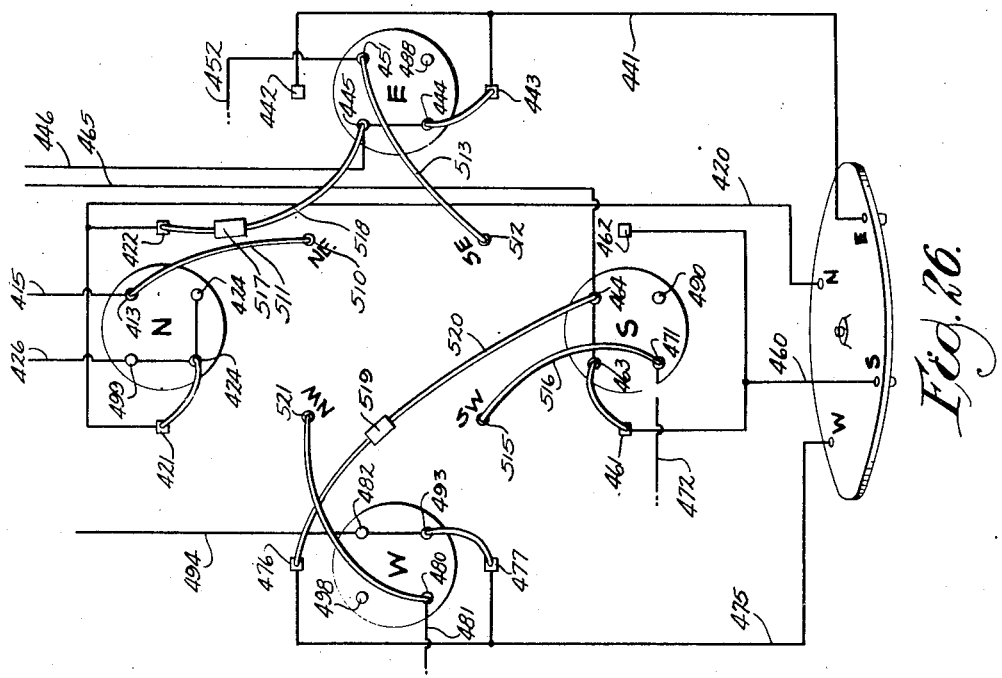
Figure 26 is a diagrammatic showing of a part of the circuit diagram shown in Figure 24 with the jumper connections necessary for one type of diagonal tracing operation.

The jumper hookup is shown in Figure 26. The plug 421 connected with the conductor 420 will have been inserted into the jack 424 in the N jack station in order to permit the current to flow through the conductor 426 to the N' contacts on the contact plates 352 and 353 in the tracer mechanism 175. If the N' contacts are then closed, the current can flow through the conductor 427 and the resistance 428 to the N clutch in the clutch and brake set 87. At the same time, the current will flow from the conductor 441 and the plug 443, previously inserted into the jack 444 in the E jack station, to the conductor 446 and the E' contacts within the tracer mechanism 175. With the E' contacts closed, the current will flow through the conductor 447 and the resistance 448 to the E clutch in the clutch and brake set 62. Thus the N clutch and the E clutch will be simultaneously energized to effect a resultant diagonal NE line feed movement.

The duration of energization of the N and E clutches is dependent upon the maximum "in" and "out" feed movement of the tracer mechanism and cutter spindles, as was previously described in detail. The extreme limits of travel will have been determined for a given pattern and the reversing switch 414 will have been predeterminately adjusted to be actuated at the said limits. With the rotating mechanism within the master switch 230 halted at the NE station, the contact block 280 in the rotatable member 278 will be positioned to complete a control circuit from the conductor 410 and the NE brush 273 to the NE brush 274 and a jack 510. A jumper wire 511 is used to carry the current from the jack 510 to the jack 413 and the conductor 415 connected thereto. The conductor 415 is connected to one terminal within the reversing switch 414. The control current cannot flow beyond the reversing switch 414 during the NE line feed movement. However, when the tracer tool in contact with the pattern 55 has reached the predetermined maximum "in" or "out" position, as the case may be, one of the stops 431 or 432 will engage the actuating rod 417 and cause the contact 416 within the switch 414 to close. The contact closure will be of a sufficient duration to permit the control current to flow through the switch 414 and the conductors 434 and 435 to the solenoid 301. After the contact 416 has been momentarily retained in the closed position, a springular trip mechanism (not shown) within the switch 414 will cause the contact 416 to return to a normally open position even though the actuating rod 417 remains in engagement with either of the two stops 431 or 432. The electrical energization of the solenoid 301 will cause the extending end 297 of the trip arm 294 in the master control switch to be raised out of engagement with the NE stop pin 261 and permit the mechanism within the switch to rotate to the SE station. This rotation will cause the N and E contacts on the contact plates 242 and 243 within the switch to be opened and therefore the NE line feed movement will be stopped.

With the master control switch halted at the SE station, an SE cross-feed movement will be immediately started. The S and E contacts on the stationary and movable contact plates 242 and 243 will be closed to permit a half cycle current flow to the conductors 441 and 460. The insertion of the plug 443 into the jack 444 in the E jack station will permit a current flow from the conductor 441 through the conductor 446, the E' contacts in the tracer mechanism 175, the conductor 447 and the resistance 448 to the E clutch in the clutch and brake set 62. Likewise, the insertion of the plug 461 into the jack 463 in the S jack station will permit a current flow from the conductor 460 through the conductor 465, the S' contacts in the tracer mechanism 175, the conductor 446 and the resistance 467 to the S clutch in the clutch and brake set 287. With both of these clutches thus energized, a resultant diagonal SE cross-feed movement will occur.

When the mechanism within the master control switch is halted at the SE station by the abutment of the arm 294 against the SE stop pin, the contact block 280 on the rotatable member 278 will be positioned to permit a control current flow from the SE brush 273 to the SE brush 274 and the jack 512 connected therewith. A jumper wire 513 serves to carry the current from the jack 512 to the jack 451 in the E jack station and the conductor 452 connected thereto. The conductor 452 is connected to the contact plate 453 within the switch 335 in the cross-feed timing mechanism 310 which is then in contact with the terminal 454. Thus the current can flow through the switch 335 and the conductor 455 to the coil winding 330. Energization of the coil winding energizes the clutch in the driving mechanism which accomplishes a clockwise rotation of the rotor 334 and the switch 335. The SE cross-feed movement will continue during the time interval in which the rotor is moved from a position against the stop 339 to a position against the stop 337 of the timing mechanism 310. When the button 336 is actuated through contact with the stop 337, the position of the plate 453 within the switch 335 is changed and the control circuit to the winding 330 is broken. At the same instant, a circuit is established from the conductor 452 through the switch 335, and the conductors 457 and 435 to the solenoid 301. The electrical energization of the solenoid 301 causes the extending end 297 of the trip arm 294 to be raised above the SE stop pin and consequently permits indexing rotation of the switch mechanism to the next line feed station, namely, the SW station. This rotation permits the S and E contacts on the contact plates 242 and 243 to open and consequently break the circuit to the S and E clutches.

The SW line feed movement is started immediately upon the closure of the S and W contacts within the master control switch 230. Thus a half cycle current will flow through the S contacts, the line 460, the plug 461 and the jack 463 in the S jack station to the conductor 465 which is connected with the S' contact on the movable plate 353 in the tracer mechanism 175. With the S' contacts in the tracer mechanism closed, the current can flow through the conductor 466 and the resistance 467 to the S clutch in the clutch and brake set 87. At the same time, half cycle current is flowing through the closed W contacts in the master switch 230 to the conductor 475. With the plug 477, attached to the conductor 475, inserted into the jack 493 in the W jack station, the current is free to flow from the conductor 475 to the conductor 494, the closed W' contacts in the tracer mechanism 175, the conductor 495, the resistance 496 and the W clutch in the clutch and brake set 62. The energization of both the S and the W clutches will cause a resultant diagonal SW line feed movement.

When the master control switch is halted at the SW station, a control circuit through the master switch is completed in the following manner. The contact block 280 on the rotatable member 278 will then span the SW brushes 273 and 274 so as to allow the control current to flow through the said brushes to a jack 515 connected to SW brush 274. A jumper wire 516 plugged across the jack 515 and the jack 471 in the S jack station serves to carry the control current to the conductor 472 and consequently to the reversing switch 414. Since this switch is open throughout a line feed movement, the control current is stopped at this point until the contact bar 416 is momentarily actuated to close the terminals within the said switch. The SW line feed movement will be stopped upon the completion of the control circuit through the reversing switch since the solenoid 301 will then be energized to cause a clockwise rotation of the master switch away from the SW station.

The mechanism within the master control switch 230 will index until the trip arm 294 therein engages the NW stop pin 261. At this station, a cross-feed movement is called for and since it is necessary to have all cross-feed movements in the same direction, the jumper connections must provide for a SE cross-feed movement at this station. In order to prevent the energization of the N and W clutches upon the closure of the N and W contacts on the contact plates 242 and 243 in the master switch, the plug 421 must be withdrawn from the jack 424 at the N jack station and the plug 477 must be withdrawn from the jack 493 at the W jack station. Thus the circuits to these two clutches are broken. Withdrawal and insertion of the plugs 424 and 427 at the beginning and at the end, respectively, of the SE cross-feed movement as originating through the NW station will preclude the energization of all four clutches simultaneously.

The half cycle current through the N and W contacts must be diverted to the S and E clutches to secure continued cross-feed in the selected SE direction. The current flowing through the N contact and the line 420 is shunted through the jack 445 and the conductor 446 leading to the E clutch. The plug 442 connected to the line 420 is plugged into a polarized relay 517. A lead wire 518 from the relay 517 is connected to the jack 445 in the E jack station. The polarized relay 517 serves to permit a current flow from the conductor 420 to the conductor 446 but will not permit a reversed current flow through the plug 422 to the conductor 420. Current from the conductor 446 will flow through the E' contacts in the tracer mechanism 175, the conductor 447 and the resistance 448 to the E clutch in the clutch and brake set 62. Current will also flow through the W contacts on the contact plates 242 and 243 to the conductor 475 and the plug 476. The plug 476 will be inserted into a polarized relay 519. A lead wire 520 therefrom will be connected to the jack 464 in the S jack station. The relay 519 serves to permit a single directional flow of current from the conductor 475 to the conductor 465 connected to the jack 464. The current will flow from the conductor 465 through the S' contacts in the tracer mechanism 175, the conductor 466 and the resistance 467 to the S clutch in the clutch and brake set 87. Thus both the S and E clutches will be energized simultaneously to effect a relative SE cross-feed movement.

A control current circuit is completed to the cross-feed timing mechanism 310 as the master control switch mechanism is halted at the NW station. The contact block 280 will span the NW brushes 273 and 274 and permit a current flow through the two brushes to a jack 521. A jumper wire 522 connected between the jack 521 and the jack 480 in the W jack station will serve to carry the current from the NW brush 274 to the conductor 481, the conductor 452 and the contact plate 453 in the switch 335 of the cross-feed timing mechanism 310. The timing mechanism 310 is energized simultaneously with the S and E clutches.

When the timing mechanism has completed its clockwise rotation, the button 336 thereon will be actuated upon engagement with the stop 337 and effect a control current flow through the conductors 457 and 435 to the solenoid 301. The solenoid 301 when energized will actuate a tripping mechanism within the master control switch and permit a clockwise indexing rotation therein to the NE station. The machine operator must immediately insert the jacks 421 and 477 into the plugs 424 and 493 at the N and W jack stations in order to complete the circuits to the N and W clutches. The withdrawal and insertion of the plugs 421 and 477 at the beginning and at the end of the SE cross-feed movement is the only place at which the machine operator must assist the control by the master control switch. The diagonal tracing across the face of a given pattern consists of a series of control operations as just described. It should be remembered that the contour of the pattern is being followed by the tracer tool 57 throughout an entire diagonal tracing operation and that the "in" and "out" clutches in the clutch and brake set 185 are being electrically energized according to the dictates of the tracer mechanism 175 to exactly duplicate the contour of the said pattern upon a given workpiece.

Four directional combinations of diagonal tracing are possible. The switch connections, as described in connection with Figure 26, provide for a diagonal tracing operation having a NE and SW line feed movement and a SE cross-feed movement. The master switch connections for a second type of diagonal tracing operation are similar to those shown in Figure 26 except that the cross-feed connections are changed to provide an NW cross-feed movement. If this change is made, a tracing operation will be provided in which there would occur an NE and SW line feed movement and an NW cross-feed movement. Because of the similarity of the connections to those shown in Figure 26, a discussion of the master switch connections and the current flow to the various control and driving elements will not be necessary.

Figure 27:
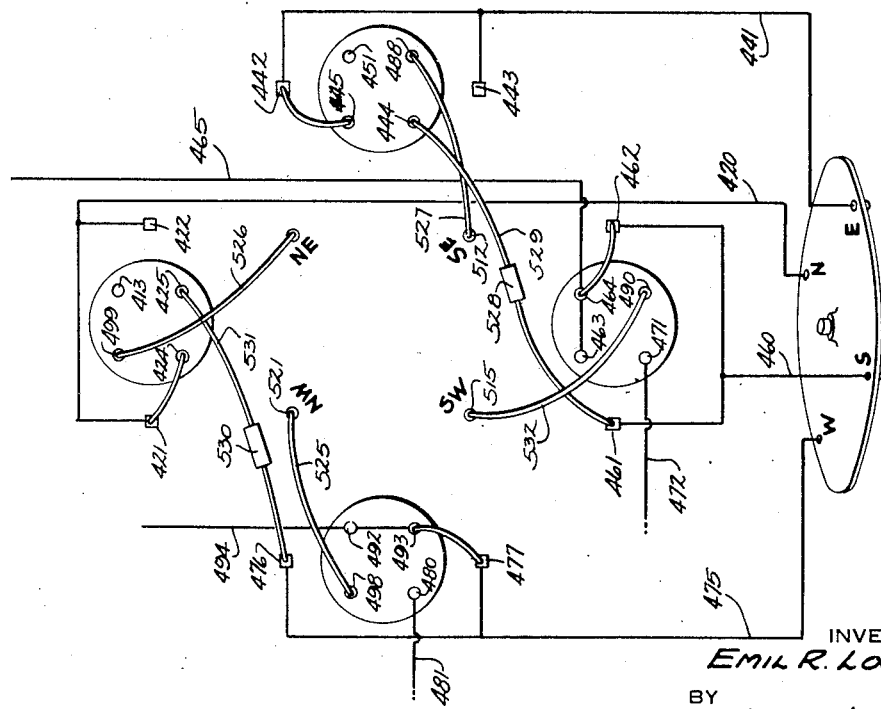
Figure 27 is a view of part of the wiring diagram shown in Figure 24 together with the master switch jumper connections required to effect one of four possible diagonal tracing operations.

A third type of diagonal tracing operation may be adapted in which an NW and SE line feed movement and an NE cross-feed movement is necessary. The electrical connections at the master control switch 230 necessary to accomplish this movement are shown in Figure 27, but need no detailed description, the mechanisms and operations used being like those described in connection with the discussion of Figure 6. The plug 421 is inserted into the jack 424 in the N jack station. Plug 477 is inserted into the jack 493 at the W jack station. A jumper wire 525 is used to conduct the current from the jack 521 to the jack 498 in the W jack station and consequently to the conductor 415 connected therewith. The plug 442 is inserted into the jack 445 in the E jack station. A jumper wire 526 will have been previously connected across the jack 510 and the jack 499 in the N jack station, to carry the current to the conductor 452 leading to the timing mechanism 310. The plug 462 has been inserted into the jack 464 in the S jack station. Plug 443 is positioned in the jack 444 in the E jack station.

A jumper wire 527 serves to carry the control current from the jack 512 to the jack 488 in the E jack station.

At the SW station, an NE cross-feed movement is demanded. To prevent the energization of the S and W clutches upon the closure of the S and W contacts in the master control switch, plug 462 is withdrawn from the jack 464 in the S jack station and plug 477 from the jack 493 in the W jack station, thereby breaking the circuit to the said clutches. However, the half cycle current flowing through the S contacts and the line 460 connected thereto must be diverted to energize the E clutch while the current flowing through the W contact and the conductor 475 must be diverted to energize the N clutch. The plug 461 connected to the conductor 460 is inserted into a polarized relay 528. A lead wire 529 from the relay 528 is connected to the jack 444 in the E jack station. The plug 476 will be inserted into a polarized relay 530 and a lead wire 531 extending therefrom will be connected to the jack 425 in the N jack station. The simultaneous energization of the N and E clutches will effect an NE cross-feed movement. At the same time, the control circuit will be completed through the SW brushes 273 and 274, the jack 515, a jumper wire 532, the jack 490 in the S jack station, the conductor 491 and the conductor 452 connecting with the switch 335 in the cross-feed timing mechanism 310.

A fourth type of diagonal tracing includes an NW line feed movement, an SE line feed movement and an SW cross-feed movement. The connections at the master control switch necessary to accomplish such a movement are similar to those shown in Figure 27 except that the connections necessary to effect cross-feed control are reversed.

Figure 21:
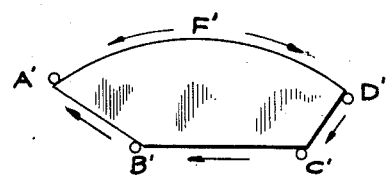
Figure 21 is a schematic view of the path of the tracer tool following the outline of a male pattern.

Contouring tracing operations can also be performed on the tracer-controlled machine tool described and disclosed in this specification. This type of tracing operation includes the condition in which it is necessary to duplicate an irregular contour of a pattern, such as are shown in Figures 19 and 21, and generally necessitate the controlled energization of clutches in two clutch and brake sets in order to accomplish any desired contour duplication.

In order to set up the machine for a contouring operation, a pattern and workpiece would be clamped to the fixture 54 vertically disposed on the table 51. The master control set 215 would be positioned so that the machine operator could easily manipulate the knob 235 on the master switch 230 while observing the action of the tracer tool 57 upon a pattern. In order to have a single line circuit to each of the four clutches N, E, S and W, plug 422 will be inserted into the jack 425 in the N jack station, plug 443 will be inserted into the jack 444 in the E jack station, plug 461 will be inserted into the jack 463 at the S jack station and plug 476 will be inserted into the jack 492 at the W jack station. All eight brush blocks are removed from an operative position and the tension on the belt 286 is released by turning the handle 291 a half turn. The switch 292 is manipulated to shut off the master switch motor 282. Thus the master control switch 230 is operable manually and serves to complete a desired clutch circuit or combination of clutch circuits as determined by the operator.

Figure 19:
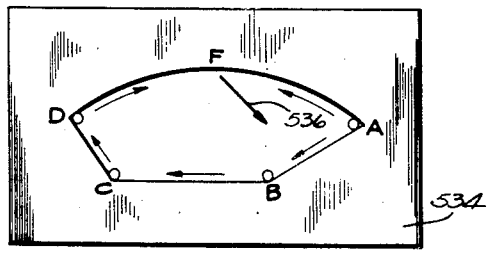
Figure 19 is a schematic view of the path of the tracer tool following the outline of a female pattern.
Figure 20:
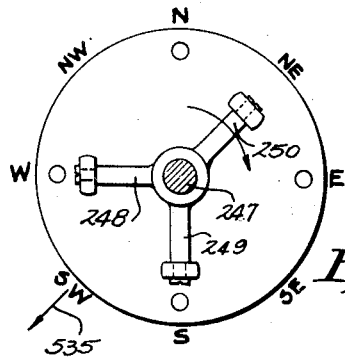
Figure 20 is a schematic top view of the tilter and its relative positions as required to explain the action thereof as the tracer tool is made to follow the pattern shown in Figure 19.

In the case of a female pattern 534 shown in Figure 19, the machine operator would select a starting point A and set the tracing tool 57 at this point on the said pattern. A cutter 58 would be positioned at a corresponding point on the workpiece. Both the tracer tool and cutter would then be axially fed into the pattern and workpiece to a predetermined depth. In the majority of the contouring operations of this type, the entire operation is performed at a given depth; therefore, the "in" and "out" clutches in the clutch and brake set 185 may be disconnected from the circuit and rendered inoperable. To duplicate the sloping section A B, the master control switch indicator 236 would be set to point to SW and consequently the circuit to the S and W clutches would be closed. This setting of the master control switch is diagrammatically suggested in Figure 20 in which the high arms 248 and 249 of the tilter 247 are positioned to effect a S and W contact closure. An arrow 535 indicates the resultant direction of travel. Normally, a 45 degree diagonal SW movement would result. However, since the slope of the line A B is less than 45 degrees, the tracer tool 57 will periodically strike the edge of the pattern and a short W movement will be interspersed between each SW movement. Thus an exact duplication of the line A B will be effected in the direction of the arrow.

At the point B, the S' contacts in the tracer mechanism 175 would be forced open while the W' contacts would remain closed and a W movement would result. The S contacts within the master switch are kept closed at this time merely to keep the tracer tool against that portion of the pattern 534 designated as B C and to duplicate any slight deviations therein. When the point C is reached, the pressure on the tracer tool will force the opening of both the S' and W' contacts in the tracer mechanism and all S or W movement will be disrupted. In order to have the tracer tool follow the portion of the pattern 534 designated as C D, the master control switch must be manually adjusted so as to close the N and W contacts therein and thereby complete the N and W clutch circuits. Normally, with both the N and W clutches energized simultaneously, a 45 degree diagonal SW movement would result. Since the slope C D lies at an angle less than 45 degrees from the vertical, the tracer tool will periodically strike the edge of the pattern 534, open the W' contacts and permit N movement only. Thus a series of alternate N movements and NW movements will result which will accomplish an exact duplication of the line C D in the direction of the arrow. If the slope of the line C D were greater than 45 degrees, the resultant cut would be exactly 45 degrees because the tracer tool could not strike the pattern at such a time to periodically open one of the clutch circuits. The travel must be from that end of a given pattern edge which affords an angle of 45 degrees or less, unless the pattern is supplemented by a stroke pattern, as in Figure 23, to require the movement to occur at a greater angle.

Starting at a point D, one half of the curved portion or D F can be traced since the angle of this curvature is less than 45 degrees. The master control switch will be manually set to complete the circuits to the N and E clutches. Movement will occur in a clockwise direction as is shown by the arrow intermediate the points D and F. When the angle is close to 45 degrees, both clutches will be energized simultaneously to produce a series of short E and NE movements. As the tracer tool gets closer to the point F, the N clutch will be cut out more often so as to produce a series of E and NE movements with the E movements continuing for longer periods of time. Beyond the point F, both the N' and E' tracer contacts would be forced open to stop all N and E movement.

Tracing in a clockwise direction cannot continue beyond the point F since the angle of curvature is greater than 45 degrees from the vertical axis. If tracing were continued in a clockwise direction with the master switch 230 set at the SE station, a diagonal SE movement, such as is suggested by an arrow 536 in Figure 19, would result. Except by the use of a supplemental pattern as elsewhere suggested, the tracer tool would never be able to engage with the edge of the pattern to reproduce the curved portion F A. Instead the tracer tool and cutter may be repositioned at the starting point A and the balance of the pattern, namely the curved portion A F, can be finished through a counterclockwise movement originating in the N and W clutches. The machine operator would position the control switch 230 with the indicator 236 pointing to the NW indicia. Thus the N and W circuits would be closed to the N and W clutches. Since the angle of curvature is always 45 degrees or less from the horizontal, the tracer tool could ride on the pattern and effect a series of W and NW movements. Both of these movements would be of an equal duration at the beginning of the operation but the W movements would gradually increase in length as the top flat portion of the curve was traced. When the tracer tool and cutter reach the point F, both the N' and W' contacts within the tracer mechanism 175 will be forced open by the pressure imparted by the pattern on the tracer tool and the circuits to the N and W clutches will be opened to stop any further N or W movement.

Figure 22:
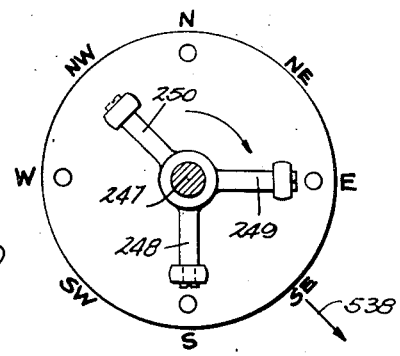
Figure 22 is a schematic view of the tilter, as in Figure 20, and serves to explain the action thereof as the tracer tool is made to follow the pattern shown in Figure 21.

A pattern 537 for a male die is shown in Figure 21. The tracer tool is made to follow the outer edges of the pattern. The tracer tool 57 is positioned at required depth at the starting point F' on the pattern while the cutter 58 is positioned at a corresponding point on the unfinished workpiece. The master control switch is set with the indicator 236 pointing at the SE indicia, as diagrammatically shown in Figure 22, wherein the two high arms 248 and 249 of the tilter 247 effect a simultaneous closure of the S and E contacts and thereby complete the circuit to the S and E clutches in the clutch and brake sets 62 and 87. The diagonal 45 degree movement resulting from the simultaneous energization of both the S and E clutches is indicated by an arrow 538. As shown in Figure 21, the tracing operation of the curved portion F'D' can be accomplished by a relative clockwise movement of the tracer tool along the edge of the pattern. The tracer tool will remain in constant contact with the pattern because the angle of curvature is less than 45 degrees.

When the point D' is reached (if no exterior pattern of a limiting nature is provided), the operator must effect manual rotation of the master control switch so as to complete the circuits to the S and W clutches. The tracer tool will now follow that portion of the pattern designated as D'C' since the slope of that portion is less than 45 degrees from the vertical. A series of minute SW and S movements created by the cyclic engagement of the tracer tool with the edge of the pattern will result in an exact duplication of the portion D'C' on the workpiece.

At the point C', the machine operator will rotate the knob on the master control switch to the NW station and thereby effect a circuit closure to the N and W clutches. Since the portion C'B' now being copied constitutes a horizontally disposed edge, the W' contacts within the tracer mechanism will remain closed to permit a continuous W movement while the N' contacts will be forced open by the pressure imposed on the tracer tool and thus no N movement will actually occur. The N clutch simply keeps the tracer tool against the edge of the pattern in the event of a slight deviation of the portion C'B' from the horizontal. Since the angle of the portion B'A' is less than 45 degrees from the horizontal, the tracer tool will automatically follow the portion B'A' after completing the portion B'C' and a readjustment of the master control switch will not be necessary at the point B'. A series of intermittent W and NW movements will effect the duplication of the portion B'A' of the pattern 537.

The portion A'F' cannot (without the aid of a supplemental pattern) be traced in a clockwise direction because the angle of curvature is greater than 45 degrees from the vertical and therefore the tracer tool would be unable to remain in contact with the edge of the pattern. Instead, the tracer tool and cutter must be returned to the starting point F' and the portion F'A' must be duplicated by a combination of W and SW movements.

In tracing a male pattern in which the tracer tool is made to follow the outer contour of the pattern, the operator will either provide an external guide pattern or be prepared to manually rotate the master control switch mechanism at each of the major turning points on the pattern. Otherwise the tracer stylus will leave the pattern at a 45 degree angle and continue on to the extreme limits of movement of the machine. In the case of the female pattern 534, the pattern itself serves to limit all movements to the minimum necessary to completely trace the outline of the said pattern. It will be apparent that with a combination of internal and external patterns the entire operation may be controlled automatically.

In addition to the specialized tracing operations which may be performed on the tracer-controlled machine tool, as previously described, it is also possible to perform any of the following operations, namely, boring, planing, drilling, milling and threading. A top plan view of the tracer and spindle headstocks, as positioned for an internal threading operation, is shown in Figure 3. A casting 540 is clamped to the table (not shown) in a manner that the rotating cutting tool 58', attached to the extending end of the outer spindle 105, may be axially fed into the inner cavity of the casting. Only controlled axial movement of the tracer mechanism 175 and the spindle 105 is necessary. Thus the circuits to the four clutches N, E, S and W are not completed through the master control switch 215. Power for the axial feed movement of the tracer and spindle mechanisms originates in the "in" and "out" clutch and brake set 185.

Automatic control over this axial movement is effected through the use of a variable speed drive mechanism 541. This mechanism is designed to operate in conjunction with the tracer mechanism 175. The power source for the mechanism 541 originates from a motor 542 mounted on the base 50 (see Figures 1, 2 and 3). The variable speed mechanism is horizontally disposed on a plate 543 directly above the motor 542. The motor effects the rotation of a pulley 544 through a belt 545. The pulley is keyed to a horizontally disposed shaft 546 bearinged in a swivelly mounted support 547. A driving disc 548 is keyed to the end of the shaft 546 in a manner that one side face thereof can engage the peripheral edges of two driven discs 549 and 550. Both of the driven discs are slidably mounted on a horizontally-disposed spline shaft 551 rotatably supported by a frame 552 bolted to the plate 543. The speed of the shaft 551 is dependent upon the spacing of the discs 549 and 550 in relation to the driver disc 548. The simultaneous adjustment of the discs 549 and 550 is effected by means of a manually operated screw mechanism 553. Thus for any given adjustment, both of the discs are operating on the same circumferential path on the side face of the driving disc 548. In order to increase the speed of the shaft 551, the discs are spaced to engage the disc 548 near its outer circumference. If the speed of the shaft 551 is to be reduced, the discs are adjustably positioned closer together in order to engage a small circumferential path on the disc 548. The screw mechanism 553 is manually operated by means of a hand crank 554.

The direction of rotation of a step pulley 555 keyed to the end of the shaft 551 is controlled in the following manner: The support 547, upon which the disc 548 is rotatably mounted, is movable on the plate 543 within predetermined limits. This movement is sufficient to bring the face of the disc 548 into contact with the peripheral edge of either the disc 549 or the disc 550. Control over the swivel movement of the support 547 and consequently the disc 548 is electrically accomplished through a pair of solenoids 556 and 557. The solenoids are disposed in axial alignment on the plate 543 so that a single armature 558 extends into both of the said solenoids. An actuating rod 559 extending from the support 547 is linked to the armature 558 in between the two solenoids. Thus when the solenoid 557 is energized, the armature 558 is magnetically attracted to effect sidewise movement of the rod 559 and consequently bring the driving disc into engagement with the disc 550, as shown in Figure 2. The energization of the solenoid 556 will cause the armature 558 to be drawn toward the solenoid and move the rod 559 and the support 547 sidewise until the disc 548 engages with the disc 549. It is well to note that only one of the driven discs are in engagement with the driving disc at any given instant. Thus the mechanism can be operated at an infinitely variable number of speeds within prescribed limits.

The step pulley 555 is connected by a belt 560 with a step pulley 561. The pulleys 555 and 561 provide three fixed speed ranges within which the mechanism can operate. However, when used in conjunction with the aforedescribed mechanism, an infinitely variable range is available within each of the three fixed ranges. The pulley 561 is designed to effect the rotation of a vertically disposed splined shaft 562 through a gear train 563 rotatably supported beneath the plate 543. The shaft 562 is rotatably journalled at its lower end at the plate 543 and at its upper end within the rearward extension of the spindle 70. An internally splined gear 564 is rotatably journalled to move vertically with the headstock 70 and yet remain in engagement with the splined shaft 562. The gear 564 meshes with an intermediate gear 565 which in turn meshes with a gear 566. The gear 566 is rotatably mounted on the lower end of the splined shaft 567. The actual driving connection between the gear 566 and the shaft 567 is effected through a clutch and hand wheel assembly 568. Clutch teeth on the hub of the gear 566 are designed to mesh with corresponding clutch teeth on the lower end of the hand wheel assembly 568. When these teeth are engaged, the gear 566 will drive the assembly 568 and consequently the shaft 567 splined to the said assembly. A bell crank control handle 569 is designed to engage with a horizontally disposed slot 570 integrally formed on the hand wheel assembly 568. With the handle 569 in the position shown in Figure 1, the clutch teeth on the assembly 568 are raised out of engagement with the teeth on the gear 566 and consequently the shaft 567 cannot be rotated. If the handle 569 is moved to a left hand position, the clutch teeth on the gear 566 and on the hand wheel assembly 568 are brought into engagement so that the rotation of the shaft 567 will be effected. The splined shaft is axially extensible through the tracer headstock 71 and is rotatably journalled therein.

A gear 571 is slidably splined to the shaft 567. Thus the gear 571 is rotatably driven by the splined shaft irregardless of the spaced relationship between the spindle headstock 70 and the tracer headstock 71. The teeth on the gear 571 mesh with the teeth on a rack 572 integrally formed on the side of a movable rod 573. This rod is horizontally disposed in a retaining groove in the tracer headstock 71. The rod 573 is axially motivated by the gear 571 in a manner that a stop 574 clamped to the forward end of the said rod may engage the tip of the tracer tool 57.

In order to perform the threading operation shown in Figure 3, the variable speed drive mechanism 541 would need to be adjusted so as to effect a predetermined axial feed of the spindle 105 for each revolution thereof. The relationship between the speed of the cutter and the feed of the cutter would necessarily have to remain constant in order to insure a perfect thread formation. Thus if the variable speed mechanism 541 does effect a forward movement of the rod 573 at a predetermined feed rate, the movement of the stop 574 on the end thereof away from the tracer tool 57 would constantly tend to permit a closure between the contacts 370 and 372. This would effect a cyclic energization of the "in" clutch of the clutch and brake set 185 which in turn would effect an axial advance of the cutter tool 58' into the casting 540. Since the formation of the casting is such that the machine operator could not see when the cutter had reached the end of the thread cut, he would determine the extreme axial travel of the spindle 105 prior to instigating a thread cutting operation and adjustably position the stop 431 on the extending flange 433 to actuate a switch 577.

Figure 28:
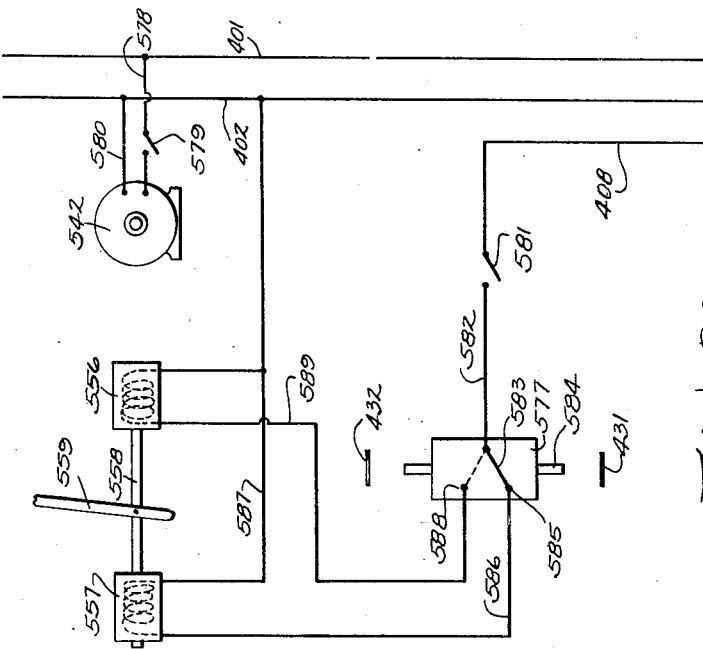
Figure 28 is the wiring diagram used in connection with the variable speed drive mechanism.

The electrical circuit used in connection with the operation of the variable speed drive mechanism 541 is shown in Figure 28. A wire 578 permits the passage of current from the conductor 401 to a switch 579. The closure of the switch 579 permits a current flow to the variable speed drive motor 542. The circuit is completed by conductor 580 extending from the motor to the common return line 402. For this type of machining operation, clutch sets 62 and 87 are rendered inoperative. The cycle separator is rendered operative by closing the switch 403. Thus the half cycle current from the brush 224 of the cycle separator 216 will flow to the contact 370 of the solenoid 373 within the tracer mechanism 175. The variation of pressure on the tip of the tracer tool 57 will serve to control the movement of the contact 370 between the "out" contact 371 and the "in" contact 372. These contact closures permit a current flow to either one of two clutches in the clutch and brake set 185. The half cycle current from the brush 225 from the cycle separator 216 is conducted by the line 408 and 504 to the brake B₃ in the clutch and brake set 185. This half cycle current is also used to energize the solenoids 556 and 557 in the variable speed drive mechanism 541. One terminal of a switch 581 is connected to the line 408 and when closed, allows a current flow through the switch and a conductor 582 to a movable contact plate 583 in the reversing switch 577. The switch 577 is clampingly attached to the slotted tube 178 supporting the tracer mechanism 175. Thus the said switch is moved in unison with the tracer mechanism 175. At this time the reversing switch 414 used in connection with the tracing operation previously described, is positioned on the slotted tube 178 so as to be inoperable.

The stop 431 is positioned on the flange 433 to engage one end of an actuating rod 584 of the switch 577 at the extreme "in" position of the spindle for a given cutting operation The stop 432 is likewise positioned on the flange 433 to engage the other end of the actuating rod 584 and is determinative of the extreme "out" movement of the tracer tool and cutter. When the contact plate 583 is moved into engagement with a terminal 585, the half cycle control current will flow through a conductor 586 to the solenoid 557 and effect the energization thereof. The circuit is completed through a conductor 587 connecting with the common return line 402. The energization of the solenoid 557 will actuate the armature 558 and the rod 559 and consequently move the driving disc 548 into engagement with the disc 550. An "in" movement of the rod 573 will consequently result from the energization of the solenoid 557. The movement of the stop 574 attached to the rod 573 away from the tip of the tracer tool 57 will constantly release the pressure on the tip of the tracer tool 57 and permit a closure of the contacts 370 and 372. Thus the "in" clutch in the clutch and brake set 185 will be energized to effect an "in" movement of the tracer tool 57 and the cutter 58' at a feed rate corresponding to the "in" feed rate of the rod 573. When the extreme "in" limit of travel has been reached, the actuating rod 584 of the switch 577 will engage with the stop 431 and cause the contact plate 583 to move away from the terminal 585 into engagement with a terminal 588. Thus the solenoid 557 will no longer be energized and the "in" feed movement of the rod 573 will be stopped and consequently the unified "in" feed movement of the tracer tool 57 and the cutter 58' will also be stopped. When the contact plate 583 is in the dotted position (as shown in Figure 28) against the terminal 588, the half cycle control current will flow through a conductor 589 to a solenoid 556. The energization of this solenoid will bring the driving disc 548 into engagement with the disc 549 and consequently effect an "out" movement of the rod 573 at the same rate of feed as the "in" feed movement. The circuit from the solenoid 556 is completed through the conductor 587 connecting with the common return line 402.

The "out" movement of the rod 573 will impart a pressure on the tip of the tracing tool 57 and consequently will effect a cyclic closure of the contacts 370 and 371. Thus the "out" clutch in the clutch and brake set 185 will be energized to effect a unified "out" feed movement of the tracer tool 57 and cutter 58'. Thus the tendency will be to constantly relieve the pressure on the tip of the tracer tool 57. However, the complete relief of pressure will never be actually accomplished, since the rod 573 is moving at the same rate of speed. The "out" feed rate of the rod 573 determines the "out" feed rate of the tracer mechanism 175 and the spindle 105. In the case of the threading operation shown in Figure 3, the "in" feed movement of the cutter 58' is identical with the "out" feed movement and consequently the cutter will be withdrawn from the casting 540 without injuring any of the threads which were cut therein during the "in" feed movement.

With the same type of setup, drilling operations could be performed in which the drilled holes would all be to an exact depth. If the machine were set up for a planing or milling operation, a reversing switch would be positioned to effect a reversal of electrical energization of the clutches in a given clutch and brake set and consequently effect a reversal of any desired line feed movement. Any one of eight line feed movements may be used to accomplish the milling or planing operation.

A modified version of the circuit diagram is shown in Figure 29. In the foregoing description of the circuit diagram relating to rectangular and diagonal tracing operations, it was necessary to make numerous connections across the various jack stations of the master control switch 215. The numerous connections tended to become confusing especially when a tracing cycle was being set up. In the modified version, all but three of these spanner connections are eliminated. This is made possible by reversing the direction of rotation of the mechanism within the master control switch 230 at the end of each line feed movement.

Half cycle current is again used to operate the clutches and brakes in the three clutch and brake sets 62, 88 and 185. Sixty cycle alternating current is obtained from a supply line $L_1$ and $L_2$. The current will flow from the supply line $L_1$ through the line 401 to the switch 403. The closure of the switch 403 allows the current to flow through the line 404 to the center brush 223 of the cycle separator 216 and to the synchronous motor 219. The circuit to the motor is completed through the line 405 and the line 402 connected with the supply line $L_2$. The cycle separator 216' (here exemplified by rectifying tube means) serves to supply two opposed half cycle currents. One half cycle is transmitted through the conductor 406 to each of the four contacts N, E, S and W on the movable contact plate 243 of the master control switch 230. The four contacts on the movable contact plate 243 are designed to engage with four contacts on a stationary contact plate 242. The tilter 247 effects a closure of at least one of these contacts at any given position but permits not more than two sets of contacts to remain closed for any given position of the mechanism within the master control switch 230.

The modified circuit diagram shown in Figure 29, differs from the circuit shown in Figure 24 in that the four jack stations each containing four jacks have been eliminated. Thus a conductor 595 connected to the end contact on the stationary contact plate 242 within the master control switch 230 is connected to the N' contact on the movable contact plate 353 in the tracer mechanism 175. A conductor 596 connects the W contact within the master switch 230 with a W' contact within the tracer mechanism 175. A conductor 597 is connected to the E contact in the master control switch and to the E' contact of the tracer mechanism and a conductor 598 is connected to the S contact within the master switch and to the S' contact within the tracer mechanism. Thus it is apparent that the machine operator need not make these connections in order to set up a desired tracing cycle. As previously described, the primary purpose of the tracer mechanism is contact breaking. That is, the four contacts N', E', S' and W' are normally closed to permit the passage of current to the respective clutches, except when a pressure is placed on the tracer tool 57, in which case one or two of the contacts are opened. The half cycle current from the conductor 406 is also used to energize the clutches in the clutch set 185.

In order to simplify the description of the modified circuit diagram it will be assumed that for a given tracing operation it would be desirable to have a diagonal NE and SW line feed movement and a diagonal cross-feed movement. Any one of four rectangular tracing cycles or four diagonal tracing cycles may be set up in the same manner. The NE stop pin 261 and NE brush block 266 as well as the SE stop pin 261 and SE brush block 266 and the SW stop pin 261 and the SW brush block 266 are disposed for engagement with the trip arm 294 and the rotatable member 278 within the master control switch 230. The stop pins and brush blocks at the other five stations within the switch are withdrawn from operable engagement with the rotating members therein. The half cycle current from the brush 225 of the cycle separator 216 is carried by the conductor 409 and the circular bus bar 410. The brushes 273 in each of the eight brush blocks within the master switch 230 are electrically connected to the bus bar 410 and therefore remain charged with half cycle current at all times.

At the start of the diagonal SW line feed movement, the trip arm 294 will engage the SW stop pin 261 and consequently the rotating mechanism within the master control switch 230 will be halted at the SW station. The contact block 280 carried by the rotatable member 278 will then be positioned to permit the passage of current from the SW brush 273 to the SW brush 274 and a jack 601. A plug on the end of a flexible jumper wire 602 will have been inserted into the jack 601. The other end of the wire 602 is permanently connected to a conductor 603 at a terminal block 604 mounted on the top of the panel 227 of the master control set 215. The conductor 603 extends from the terminal block 604 to a terminal 605 in an indexing switch 606 mounted for axial operation with the tracer mechanism 175, as previously described. Thus, with the master control switch halted at the SW station, the half cycle current is free to flow through the wire 602 and the conductor 603 to the reversing switch 606. At this time, the S and W contacts on the contact plates 242 and 243 within the master control switch 230 are closed. The half cycle current from the conductor 406 will flow through the closed S and W contacts, and the conductors 598 and 596 to the closed S' and W' contacts within the tracer mechanism 175.

The half cycle current passing through the S' contacts of the tracer mechanism is used to energize the S clutch in the clutch and brake set 87. The current will flow through the conductor 466 and the resistance 467 to one terminal of the S clutch. At the same time, half cycle current will flow through the closed W' contacts in the tracer mechanism 175, the conductor 495 and the resistance 496 to the W clutch in the clutch and brake set 62. With both the S and W clutches energized, a diagonal SW line feed movement will occur. This movement will continue until an extending button 607 on the reversing switch 606 is depressed through engagement with the stop 431.

The actuation of the button 607 will effect a contact closure across the terminal 605 and a terminal 608 within the reversing switch and permits a control current flow to a reversing mechanism 609. This mechanism serves to effect a reversal of the rotation of the mechanism within the master control switch 230 at the end of each line feed movement. Power to effect the indexing rotation of the mechanism within the master control switch 230 originates from an electric motor 610. This motor is started by closing the switch 407 in the supply line 401. The operation of the motor 610 is continuous during the automatic operation of the master control switch 230. A conical shaped driving member 611 of a friction clutch 612 is keyed to a shaft 614 extending from the motor 610. Two driven members 615 and 616 of the friction clutch 612 are keyed to the hollow shaft 279 within the master control switch in place of the pulley 281, previously described. With the motor 210 in the neutral position (shown in Figure 29), the frictional surfaces of the driving member 611 are out of contact with the frictional surfaces of the end of the driven members 615 and 616. Thus when the motor 610 is retained in the horizontal position, a rotative force is not imparted to the vertically disposed shaft 279 within the master switch. A conically shaped idler 617 is disposed between the driven members 615 and 616 directly opposite from the driving member 611. The idler 617 serves to retain the driven members in a balanced position.

The motor 610 is mounted for bodily adjustment about a pivot 610'. Armature 618 is fixedly attached to the frame of the motor 610. An electromagnet 619 is fixedly positioned to magnetically attract one end of the armature 618 while an electromagnet 620 is likewise disposed to magnetically attract the other end of the armature. When the contact closure within the switch 606 permits a control current flow through the terminal 608 and a conductor 621, the solenoid 619 connected therewith will be energized. A magnetic field will be built up to attract the armature 618 and pivot the motor 610 to a position whereby the driving member 611 will engage the driven member 615 and effect a counterclockwise rotation of the rotatable mechanism within the master control switch. Thus the trip arm 294 within the master control switch will be rotated counterclockwise until it engages the SE stop pin 261. The counterclockwise rotation of the member 278 will cause the contact block 280 to move out of engagement with the SW brushes 273 and 274 and therefore the control circuit to the reversing switch 606 in the electromagnet 619 will be broken. Holding relays 619' and 620' in the circuits to the respective electromagnets provide a means for continuing the counterclockwise rotation of the master switch indexing mechanism, even though the control circuit is broken at the switch. At the same time, the action of the tilter 247 upon the movable contact plate 243 within the master control switch will cause the S and W contacts thereon to open and thereby break the circuit to the S and W clutches. The diagonaly SW line feed movement will stop immediately.

At the SE station, the S and E contacts on the movable contact plate 243 will be brought into engagement with the S and E contacts on the stationary contact plate 242. Thus the half cycle current will flow from the line 406 through the S contacts and the conductor 598 to the normally closed S' contacts within the tracer mechanism 175. Thereafter the current will flow through the conductor 406 and the resistance 467 to the S clutch in the clutch and brake set 87. At the same time, the current will flow through the closed E contacts within the master switch, the conductor 597, the closed E' contacts within the tracer mechanism, the conductor 447 and the resistance 448 to the E clutch in the clutch and brake set 62. Thus the S and E clutches will be simultaneously energized to effect a diagonal SE cross-feed movement.

When the trip arm 294 engages with the SE stop pin 261, a slip clutch means 615' between the driven member 615 and shaft 279 will momentarily absorb the rotattive force imparted from the motor 610 even though the rotative mechanism attached to the shaft 279 within the master control switch is unable to turn. The contact block 280 carried by the member 278 which is keyed to the shaft 279 will be positioned across the SE brushes 273 and 274. Thus the half cycle control current will flow from the bus bar 410 through brushes to a jack 622 electrically connected to the SE brush 274. Since this is a cross-feed station, a plug on the end of a cross-feed jumper wire 623 will have been previously inserted into the jack 622 when this tracing cycle was originally set up by the machine operator. The other end of the wire 623 is permanently attached to a conductor 624 at the terminal block 604. The conductor 624 is connected to one terminal of a snap switch 625 disposed on the end of the rotor arm 334 within the cross-feed timing mechanism 310.

One terminal of the coil winding 328 is also connected to the conductor 624. The half cycle control current will flow through the winding 330 and effect a driving connection within the cross-feed timing mechanism 310. The circuit from the coil winding is completed through a conductor 626 connecting with the main line L1. The rotor 334 carrying the switch 626 will be indexed in a clockwise direction until the actuating button 336 extending from the switch 625 strikes the stationary stop 337. The time interval occurring during the movement of the rotor 234 through a predetermined arc is determinative of the length of cross-feed movement. The actuation of the button 336 will close the contacts within the switch 625 and permit a half cycle control current to flow through a conductor 627 to the master switch tripping solenoid 301. The circuit is completed through the line 436, closed switch 305 and the conductor 626 to the main line L2. The energization of the solenoid 301 will impart a downward movement to the rod 298 within the master control switch and cause the extending end 297 of the trip arm 294 to be raised out of engagement with the SE stop pin 261 (see Figure 14).

When the abutting relationship between the trip arm 294 and the SE stop pin 261 is eliminated, the friction clutch 612 is prepared to resume a counterclockwise rotation and impart such a rotative force to the mechanism within the master control switch. The contact block 280 will move out of engagement with the SE brushes 273 and 274 and the control circuit to the cross-feed timing mechanism will be opened. Thus the coil winding 330 will no longer be energized to effectively impart the clockwise driving force to the rotor 334 of the timing mechanism. A spring means, previously described, will effect a counterclockwise rotation of the rotor 334 until the actuating button 338 extending from the switch 625 is again actuated through engagement with the adjustable stop 339. The actuation of the button 338 will again open the switch 625 and thereby prepare the cross-feed timing mechanism for the next control current impulse. The rotation of the tilter 246 within the master control switch will cause the S and E contacts on the movable contact plate 243 to open and consequently the circuit to the S and E clutches will be broken. The diagonal SE cross-feed movement will be stopped immediately.

The counterclockwise rotation of the mechanism within the master control switch is free to continue until the trip arm 294 engages with the extending NE stop pin 261. At this time, the N and E contacts on the contact plates 242 and 243 will be closed to permit a half cycle current flow to the respective conductors 595 and 597 and the corresponding contacts N' and E' within the tracer mechanism 175. From the E' contact, the current will flow through the conductor 447 and the resistance 448 to the E clutch in the clutch and brake set 62 and from the N' contact, the current will flow through the conductor 427 and the resistance 428 to the N clutch in the clutch and brake set 87. With the N and E clutches both energized simultaneously, a diagonal NE line feed movement will be instigated.

At the NE station, the control current is free to flow from the bus bar 410 and the NE brush 273 through the contact block 280 to the NE brush 274 and a jack 630 connected therewith. In setting up the master control switch for this particular tracing operation, the machine operator will have inserted a plug on the end of a jumper wire 631 into the jack 630 in order to permit the half cycle control current to flow to a conductor 632 connecting with a terminal 633 within the reversing switch 606. The control current cannot flow beyond this point as long as the reversing switch 606 is operably positioned between the stops 431 and 432. However, when a button 634 extending from the reversing switch is brought into engagement with the stop 432 predeterminately positioned at a point representing the extreme limit of line feed movement, a contact closure within the switch will permit a current flow from the terminal 633 to a terminal 635 and a conductor 636 connected thereto. Thus the holding relay 619' for magnet 619 will be released and magnet 620 will be energized to impart a magnetic attraction to the armature 618 and effect the pivoted movement of the said armature and the motor 610 attached thereto. The circuit to the solenoid 619 and 620 is completed through a conductor 637 connecting with the common return line 402. Holding relay 620' serves to lock the armature 618 and the motor 610 in the lower position.

The downward movement of the motor 610 and its appending shaft 614 and driving element 611 will cause a sufficient driving force to be imparted to the driven member 616 keyed to the shaft 279 so as to effect a clockwise rotation of the rotatable mechanism within the master control switch. Thus the N and E contacts will be opened to stop the diagonal NE line feed movement as the trip arm 294 moves away from the NE stop pin 261. As the contact block 280 is rotated in a clockwise direction, the control circuit through the NE brushes 273 and 274 will be opened and the solenoid 620 in the reversing mechanism 609 will no longer be energized. However, the detent mechanism will hold the armature and motor in the lower position and insure a continued clockwise rotation. When the trip arm 294 engages the SE stop pin 261, slip clutch 615' will permit the continued rotation of member 616 even though the shaft 279 is momentarily halted. At the SE station, the S and E contacts within the master control switch will again be closed to permit the energization of the S and E clutches. A diagonal SE cross-feed movement will result. This movement will continue for a predetermined period while the winding 330 within the cross-feed timing mechanism 310 is energized to effect the clockwise rotation of the rotor 336. When the button 336 meets with the stop 337, the half cycle control current is diverted to the tripping solenoid 301 and the resulting movement of the trim arm 294 will free it from engagement with the SE stop pin 261.

The mechanism within the master control switch is then free to continue its clockwise rotation. This rotation will cause the control circuit to the cross-feed timing mechanism 310 and the clutch circuits to the S and E clutches to be broken. Consequently, the diagonal SE cross-feed movement will stop. The clockwise rotation within the master control switch 230 will continue until the trip arm 294 again meets with the SW stop pin 261. At this time the S and W contacts within the master switch will be closed to complete a circuit to the S and W clutches and thereby instigate another diagonal SW line feed movement. Thus one complete cycle of a diagonal tracing operation will have been completed. The cycle as described will be repeated until the entire face of the pattern is traced.

During the diagonal line feed and cross-feed movements, the half cycle current from the conductor 406 was also supplied to the double-faced contact 370 on the contact arm 368 and the solenoid 373 within the tracer mechanism 175. The variation in the contour of the pattern will have caused a series of variations on the tip of the tracer tool 57. These variations in pressure are reflected in corresponding movements of the arm 368 and the contact 370. A decrease in pressure on the tip of the tracer tool 57 will cause a predominating engagement of the contacts 370 and 372. Thus the half cycle current would flow through the conductor 484 and the resistance 485 to the N clutch of the clutch and brake set 185. As previously explained, the tracer tool and cutter would be moved toward the pattern and workpiece respectively. If the contour of the pattern is such that the pressure on the tip of the tracer tool 57 is increased, the contact 370 within the tracer mechanism 175 would be moved into engagement with the "out" contact 371 and the half cycle current would then flow through the conductor 481 and the resistance 482 to the "out" clutch in the clutch and brake set 185. Thus the tracer tool and cutter would move away from the pattern and workpiece.

With the modified wiring diagram shown in Figure 29, it is also possible to make the machine perform straight drilling, milling, planing and boring operations, as previously described. If a two-directional contouring operation is to be manually performed, a switch 638 in the line 406 would be opened to prevent the energization of either of the two clutches in the clutch and brake set 185. The three jumper wires 602, 623 and 631 would not be inserted in any of the jacks; therefore, the reversing mechanism 609 and the cross-feed timing mechanism 310 would be rendered inoperable. The motor 610 would be manually positioned in the neutral position, as shown in Figure 29, so that the master control switch 230 could be manually rotated.

Figure 23:
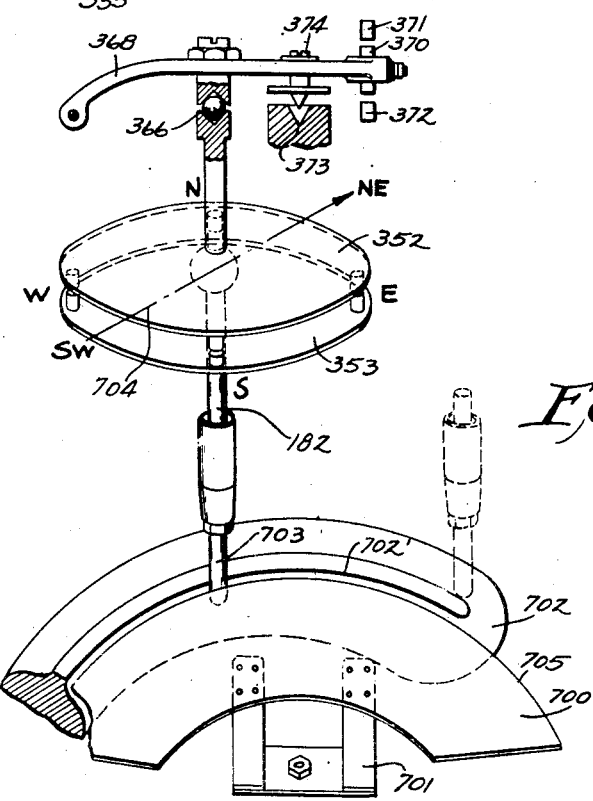
Figure 23 is a schematic perspective view of the tracer head assembly and tool in following the outlines of a curved pattern and guide plate.

In the schematic view Figure 23, the pattern 702 having a curved bead 702' is provided with a supplemental fixed stroke pattern 700 held by bracket 701 slightly above the main pattern. The master switch will be set for line feed movement of pattern and work in the NE, SW direction indicated by arrow 704. The tracing (and cutting) will follow the contour of the margin 705 of the stroke pattern while the movement of the work in the feed direction indicated and the cross-feed direction at right angles thereto will result in "In" and "Out" movements of tracer point 703 to reproduce the contours of the main pattern by opening and closing movements of contact 370 respecting the "in" contact 372 and "out" contact 371. As illustrated, the tracer 703 is engaged with the margin 705 of stroke pattern 706, thereby momentarily opening both the S and W contacts on plates 352, 353 and also opening the "in" contact 372 and closing the "out" contact 371.

The "in" and "out" contacts of the tracer may be opened and closed by axial movement of the stylus without opening any of the directional circuits. But lateral pressure on the stylus will open the appropriate directional circuit (according to the direction of such pressure) and will also open the "in" circuit until the automatic feed can relieve the lateral pressure. Thus my tracer can respond to both axial and lateral pressure for three dimensional control.

From the foregoing explanation of the construction and operation of a preferred embodiment of the invention, it is apparent that the invention has provided an improved electrically controlled tracing machine. Although only several variations of the invention have been shown and described, it will be apparent to those skilled in the art to which this invention relates that various modifications in the construction of the machine may be effected without departing from the spirit and scope of the invention as defined in the subjoined claims.

I claim:

1. In a machine tool, the combination with a tool carrier and a work support, of transmission mechanism controllable for producing a plurality of transverse paths of relative movement between said carrier and support, means including a tracer for pattern controlled operation of said mechanism in at least two paths and normally engageable with a pattern, and other control means including a stop with which the pattern engaging portion of said tracer is alternatively engageable for controlling said mechanism independently of the pattern.

2. In a machine tool, the combination with a tool carrier and a work carrier, of feed mechanism for producing relative motion therebetween, a tracer provided with operative connections for the regulation of the operation of said mechanism, said tracer being normally engageable with a pattern to control said feed mechanism as in copying, a movable stop positioned for engagement by said tracer, and a variable speed drive for the actuation of said stop in the path of the tracer, whereby to control through said tracer the operation of said feed mechanism independently of any pattern.

3. A multiple purpose copying machine tool, comprising the combination with a tool carrier and a work carrier, a support upon which the respective carriers are mounted for relative movement, feed mechanism for effecting relative movement between said carriers, said feed mechanism including driving connections for starting, stopping and reversing such movement, a tracer operatively connected to control said driving connections and adapted for engagement with a pattern for use in copying, and a stop removably positioned in the path of said tracer and engageable therewith, a mounting on which said stop is movable in the path of the tracer, and a variable speed drive for the actuation of said stop upon its movement in the path of the tracer, whereby to control the rate and direction of relative feed movement between said carriers.

4. A multiple purpose machine tool for pattern-copying, boring, grinding, thread cutting and allied functions, said machine tool comprising a work carrier, a tool carrier, a pattern support on one of said carriers, a tracer on the other of said carriers, means upon which said carriers are mounted for three-dimensional movement including in-and-out movement and at least two directions of cross feed movement, feed mechanisms for the respective movements, driving connections including means for starting and stopping the several feed mechanisms, said driving connections being operatively provided with regulating means subject to the control of said tracer, whereby said tracer controls each of the several feed mechanisms, a stop mounted on the carrier provided with the pattern support and positioned in the path of the tracer to be engaged thereby, and driving connections for said stop for moving the stop with reference to the tracer, whereby the tracer acts as a power relay for enabling said last mentioned driving connections to control relative movement between said carriers.

5. In a multiple purpose machine tool for pattern-cutting, boring, grinding, thread cutting and the like, the combination with a work carrier, of a tool carrier comprising a spindle provided with a ram, means for actuating said ram to move said tool spindle to and from said work carrier, means for cross feeding one of said carriers with respect to the other, a tracer mounted on one of said carriers, tracer controlled mechanism for driving said ram actuating means and including forward and reverse clutches subject to the control of the tracer, and a stop disposed in the path of the tracer and engaged thereby and provided with separately controllable connections for actuating said stop in the tracer path, whereby the rate and direction of operation of the stop will be determinative of the rate and direction of operation of the ram and tool carrier.

6. A device of the character described, comprising the combination with a work carrier, of a plurality of tool carriers comprising concentric spindles, means for the rotation of the respective spindles, ram means for the advance and retraction of the respective spindles, a tracer, tracer controlled mechanism for the advance and retraction of at least one of said ram means, and tracer engaged means operable through the tracer for regulating the last mentioned mechanism.

7. In a device of the character described, the combination with a work carrier and a tool carrier mounted for relative movement in a plurality of mutually transverse paths transmission mechanism for said movements in each of said paths, a tracer on one of said carriers, a pattern upon the other, connections from said tracer for controlling the feed movement of said carriers in one of said paths to and from each other, and trip means controlled in the relative movement of said carriers in the last mentioned path for determining the extent of movement in another of said paths.

8. In a machine for enabling the conformation and extent of a pattern to control the feed movement of a tool to and from the work and the length of traverse between the tool and work, the combination with a tool carrier and a work carrier mounted for movement to and from each other and for relative feed traverse movement, of feed mechanism for producing relative movement of said carriers to and from each other, a traverse mechanism for producing relative traverse movement of said carriers and including a reverser in its driving connections, a pattern mounted on one of said carriers, a tracer mounted on the other of said carriers and provided with operative controlling connections to said feed mechanism for regulation of the movement of said carriers to and from each other, and stop means operatively connected with said reverser for reversing the direction of traverse movement between said carriers, said stop means including parts mounted on the respective carriers and engageable at a predetermined spacing of said carriers, achieved at different lengths of traverse according to the portion of the pattern traversed by the tracer, whereby the feed movement of said carriers reverses the direction of traverse movement when it passes a predetermined point.

9. In a device of the character described, the combination with a tool carrier and a work carrier, of feed mechanism for advancing and retracting said carriers with respect to each other, said feed mechanism comprising a driven part, a pair of driving parts connected for opposite rotation, an electromagnetic clutch means for connecting the driven part alternatively with the driving part and an electromagnetic brake means for interrupting the motion of the driven part, a tracer connected with one of said carriers, a pattern connected with the other of said carriers, a source of alternating electrical current, a synchronous motor operated in accordance with the cycles thereof, and a rotary cycle dividing switch connected with said motor to be actuated thereby and having segments and brushes for delivering one cycle of said alternating current to the tracer and another cycle thereof to the brake, said segments and brushes being so synchronous with respect to the cycles of the alternating current that the current flow changes as between the tracer and brake at the interval between the cycles of said current when substantially no current is flowing, thereby avoiding arcing, said tracer comprising a switch for directing to the one or the other of said electromagnetic clutches the direct current received at the tracer.

10. In a device of the character described, the combination with a work carrier and a tool carrier mounted for relative movement in opposite directions of line feed and in opposite directions of cross feed, first and second feed mechanisms operatively connected to produce relative carrier movement in the line feed directions, third and fourth feed mechanisms operatively connected to produce relative carrier movement in the cross feed directions, a tracer universally pivoted for movement with one of said carriers and for oscillation upon its pivot in any direction upon encountering a pattern connected with the other of said carriers, four stationary contacts substantially symmetrically disposed about the pivot of the tracer, four complementary contacts connected with the tracer and normally in circuit closing engagement with the four stationary contacts respectively, electrical means for controlling the operation of said several mechanisms and including circuits connected to the respective mechanisms through the respective pairs of contacts aforesaid, and control means elsewhere in the respective circuits determinative of the mechanism which is operative at any given time to produce relative movement between said carriers, the said circuits through the tracer contacts being adapted to be interrupted at the tracer contacts by movement of the tracer in any direction upon lateral engagement of the tracer and the pattern, whereby said tracer is universally available to interrupt relative movement between said carriers in any of said directions regardless of the direction in which such relative movement is occurring.

11. In a device of the character described, the combination with a work carrier and a tool carrier mounted for relative movement in a direction to and from each other and in line feed and cross feed directions, of six sets of driving mechanisms operatively connectible to produce relative movement between said carriers in the several directions, a tracer mounted for universal lateral and axial movements and to move bodily with one of said carriers, the other of said carriers being adapted to support a pattern with which said tracer is engageable, means whereby one of said driving mechanisms is normally connected to move the carriers toward each other, tracer contacts adapted in displacement of said tracer either laterally or axially to disconnect said last mentioned mechanism and to connect the opposite mechanism for moving said carriers from each other, directional contacts positioned about the axis of said tracer, tracer contacts complementary to the directional contacts and normally engaged therewith, said directional contacts being connected respectively with the remaining mechanisms for producing movement in the line feed and cross feed directions, whereby any lateral displacement of the tracer will open at least one such directional contact to interrupt the direction of feed occasioning such displacement, and a control set comprising pairs of directional contacts selectively engageable to determine the directions of line and cross feed subject to interruption by tracer displacement.

12. In a device of the character described, the combination with a work carrier and a tool carrier mounted for relative movement in a direction to and from each other and in line feed and cross feed directions, of six sets of driving mechanisms operatively connectible to produce relative movement between said carriers in the several directions, a tracer universally mounted to move bodily with one of said carriers, the other of said carriers being adapted to support a pattern with which said tracer is engageable, means whereby one of said driving mechanisms is normally connected to move the carriers toward each other, tracer contacts adapted in either lateral or axial displacement of said tracer to disconnect said last mentioned mechanism and to connect the opposite mechanism for moving said carriers from each other, directional contacts positioned about the axis of said tracer, tracer contacts complementary to the directional contacts and normally engaged therewith, said directional contacts being connected respectively with the remaining mechanisms for producing movement in the line feed and cross feed directions, whereby lateral displacement of the tracer in any direction will operate at least one such directional contact to interrupt the direction of feed occasioning such displacement, a control set comprising pairs of directional contacts selectively engageable to determine the directions of line and cross feed subject to interruption by tracer displacement, and means biasing said tracer for movement upon its pivot to a central position, whereby to re-establish the directional feed between carriers as soon as the displacement of the tracer is relieved by the movement of the second of said mechanisms in retracting said carriers from each other.

13. In a device of the character described, the combination with a tool carrier and a work carrier mounted for relative movement in directions of line feed and cross feed, of a tracer mounted for movement with one of said carriers, of feed mechanism for producing relative movement between said carriers in the directions aforesaid, an electrical control set in operative connection with said mechanisms to determine which thereof shall be operative at a given time, said control set comprising a master switch for energizing said mechanisms, circuit connections from said master switch to the individual mechanisms, and normally closed directional control switches operatively connected with the tracer to be opened upon any lateral displacement of the tracer for the interruption of the feed movement occasioning such displacement.

14. In a device of the character described, the combination with a work carrier and a tool carrier mounted for relative movement in line feed and cross feed directions, of feed mechanisms respectively operatively connected for the relative movement of said carriers in different of said directions and an electric control set for said mechanisms comprising a pattern controlled tracer device, a remote master switch, current supply connections to said switch, and flexible leads from said master switch to said tracer device, said master switch comprising individual contacts for the respective mechanisms.

15. In a device of the character described, the combination with a work carrier and a tool carrier mounted for relative movement in line feed and cross feed directions, of feed mechanisms respectively operatively connected for the relative movement of said carriers in different of said directions and an electric control set for said mechanisms comprising a pattern controlled tracer device, a remote master switch operable independently of the pattern controlled tracer device, current supply connections to said switch and flexible leads from said master switch to said tracer device, said master switch comprising individual contacts for the respective mechanisms, and movable contact means selectively engageable with one or more of said first mentioned contacts, whereby to energize said mechanisms for relatively moving said carriers in one of said directions only or simultaneously in two of said directions.

16. In a device of the character described, the combination with a tool carrier and a work carrier mounted for relative movement in line feed and cross feed directions, of four directional feed mechanisms respectively operable for relatively feeding said carriers to and fro in the respective directions, a tracer mounted for movement with one of said carriers and universally fulcrumed for angular displacement in any direction upon its fulcrum, four pairs of directional contacts, one contact of each pair being operatively connected with the tracer to be displaced from normal engagement with the other contact of the pair upon displacement of the tracer in the corresponding direction, the contacts of the several pairs being normally closed, a remote control set comprising four pairs of directional switch contacts and wiring connections from said last mentioned contacts through the directional contact pairs first mentioned to the respective mechanisms, and means enabling said wiring connections to actuate said mechanisms, whereby the particular relative direction of movement between said carriers may be determined at said control set subject to interruption upon displacement of the tracer.

17. In a device of the character described, the combination with a work carrier and a tool carrier mounted for line feed and cross feed movements and mechanisms operatively connected for effecting relative movements in the respective directions of line feed and cross feed, of electrical means for rendering the several mechanisms effective and a control set for determining the sequence and period of effectiveness of the several mechanisms, said control set comprising switch means for energizing one of the cross feed mechanisms, adjustable means operable independently of said control set for determining the period of operation of the cross feed mechanism, and means for energizing the line feed mechanism upon termination of the operation of the cross feed mechanism by said adjustable means.

18. In a device of the character described, the combination with a work carrier and a tool carrier mounted for relative movement in line feed and cross feed directions and feed mechanisms operatively connected to effect relative movement of said carriers in the several directions, of electrical means for energizing the respective feed mechanisms aforesaid, and a directional control set comprising a switch having at least four pairs of directional contacts in operative connection with said energizing means, and mechanism for the mechanical actuation of said switch for the successive operation of a plurality of said contacts in a predetermined order.

19. In a device of the character described, the combination with a work carrier and a tool carrier mounted for relative movement in line feed and cross feed directions and feed mechanisms operatively connected to effect relative movement of said carriers in the several directions, of electrical means for energizing the respective feed mechanisms aforesaid, and a control set comprising a rotatable actuator mounted for indexing movement, pairs of switch contacts located at several stations in the path of such movement and operatively connected in series with said mechanisms for the energization thereof, means for advancing said actuator from one station to the next, and means for controlling the dwell of the actuator at a given station.

20. In a device of the character described, the combination with a work carrier and a tool carrier mounted for relative movement in directions of line feed and cross feed, of feed mechanisms operable to effect the respective movements, means for electrically rendering the respective mechanisms operative, a tracer provided with a universal fulcrum mounting for movement with one of said carriers and provided with sets of normally closed tracer contacts connected in series with said last mentioned means and adapted to be opened upon lateral displacement of said tracer to interrupt the operation of the mechanism effecting the relative carrier movement productive of such displacement, and a control set comprising a rotatable actuator adapted for indexing movement between a series of stations, directional switches at the respective stations subject to the control of said actuator and connected in series through the electrical contacts of the tracer with said mechanisms to determine the mechanism or mechanisms operative to produce movement between said carriers, means for mechanically indexing said actuator to close said switches singly and in successive pairs.

21. In a device of the character described, the combination with a work carrier and a tool carrier mounted for relative movement in directions of line feed and cross feed, of feed mechanisms operable to effect the respective movements, means for electrically rendering the respective mechanisms operative, a tracer provided with a universal fulcrum mounting for movement with one of said carriers and provided with sets of normally closed tracer contacts connected in series with said last mentioned means and adapted to be opened upon lateral displacement of said tracer to interrupt the operation of the mechanism effecting the relative carrier movement productive of such displacement, and a control set comprising a rotatable actuator adapted for indexing movement between a series of stations, directional switches at the respective stations subject to the control of said actuator and connected in series through the electrical contacts of the tracer with said mechanisms to determine the mechanism or mechanisms operative to produce movement between said carriers, means for mechanically indexing said actuator to close said switches singly and in successive pairs, detent means for interrupting the movement of the actuator to occasion a dwell thereof at a predetermined station, and adjustable means for releasing said detent means after a predetermined dwell.

22. In a device of the character described, the combination with a work carrier and a tool carrier mounted for relative movement in directions of line feed and cross feed, of feed mechanisms operable to effect the respective movements, means for electrically rendering the respective mechanisms operative, a tracer provided with a universal fulcrum mounting for movement with one of said carriers and provided with sets of normally closed tracer contacts connected in series with said last mentioned means and adapted to be opened upon lateral displacement of said tracer to interrupt the operation of the mechanism effecting the relative carrier movement productive of such displacement, and a control set comprising a rotatable actuator adapted for indexing movement between a series of stations, directional switches at the respective stations subject to the control of said actuator and connected in series through the electrical contacts of the tracer with said mechanisms to determine the mechanism or mechanisms operative to produce movement between said carriers, means for mechanically indexing said actuator to close said switches singly and in successive pairs, and means subject to the control of the tracer for effecting the movement of said actuator from one station to the next upon completion of a line feed movement between said carriers.

23. In a device of the character described, the combination with a work carrier and a tool carrier mounted for relative movement in north-south and east-west directions, of feed mechanisms operable for producing relative movement between said carriers in the respective directions, and control means for actuating said feed mechanisms in alternate pairs, whereby to produce a line feed on a diagonal of said directions and a cross feed upon the opposite diagonal of said directions.

24. In a device of the character described, the combination with a work carrier and a tool carrier mounted for relative movement in the north-south and east-west directions, of feed mechanisms operable for producing relative movement between said carriers in the respective directions, and control means for actuating said feed mechanisms in alternate pairs, whereby to produce a line feed on a diagonal of said directions and a cross feed upon the opposite diagonal of said directions, said control means comprising electrically energized means for rendering said mechanisms effective, a separate switch having contacts in operative series connection with each of said energizing means, and means for selectively closing said switches in pairs.

25. In a device of the character described, the combination with a work carrier and a tool carrier mounted for relative movement in north-south and east-west directions, of feed mechanisms operable for producing relative movement between said carriers in the respective directions, control means for actuating said feed mechanisms in alternate pairs, whereby to produce a line feed on a diagonal of said directions and a cross feed upon the opposite diagonal of said directions, said control means comprising electrically energized means for rendering said mechanism effective, switches having pairs of contacts respectively connected in series with the energizing means of the respective mechanisms, a rotary actuator comprising mechanisms adapted at successive stations to close the contacts of said switches in successive pairs, means for advancing said actuator from one station to another, detent means for effecting a dwell of said actuator at a station, and a timing device operatively connected to be rendered active when said actuator reaches a given station and comprising means for retracting said detent means, whereby to effect the advance of said actuator to another station.

26. In a device of the character described, the combination with a work carrier and a tool carrier mounted for relative movement in directions of line feed and cross feed, of actuating mechanisms for effecting such movement in each of said directions and means for automatically predetermining the sequence of operations of said feed mechanisms, said last mentioned means comprising electrically operable devices connected with the respective mechanisms for rendering them effective, switches connected in series with the respective devices, an actuator movable to successive stations at which such switches are located, means for driving said actuator to operate the switches at successive stations, means for causing said actuator to dwell at each station, tracer controlled means for initiating the advance of the actuator from a station at which a line feed has been effected, and means including a self timer for effecting the advance of the actuator from a station at which a cross feed has been effected.

27. In a device of the character described, the combination with a tool carrier and a work carrier mounted for relative movement in line feed and cross feed directions, of mechanisms operable for effecting the relative movement of said carriers in the several directions and means for automatically controlling the sequence of operation of said mechanisms, said last mentioned means comprising a device for determining the direction of line feed, means for interrupting the line feed at the conclusion thereof, a device for determining the direction of cross feed, means for determining the length of cross feed operation and for interrupting the cross feed at the conclusion thereof, and means for determining a direction of line feed opposite to the direction of line feed first mentioned.

28. In a device of the character described, the combination with a tool carrier and a work carrier mounted for relative movement in line feed and cross feed directions, of mechanism operable for effecting the relative movement of said carriers in the several directions and means for automatically controlling the sequence of operation of said mechanisms, said last mentioned means comprising a device for determining the direction of line feed, means for interrupting the line feed at the conclusion thereof, a device for determining the direction of cross feed, means for determining the length of cross feed operation and for interrupting the cross feed at the conclusion thereof, means for determining the direction of line feed opposite to the direction of line feed first mentioned, said means for determining the sequence of operations including electrical connections to said mechanisms, direction switches connected in series with said connections, and a tracer mounted on one of said carriers and fulcrumed for universal displacement and operatively connected with said direction switches for the opening of a switch on the displacement of said tracer to interrupt the actuation of a mechanism productive of the movement occasioning such displacement.

29. In a device of the character described, the combination with a tool carrier and a work carrier mounted for relative movement in line feed and cross feed directions and feed mechanisms operable to effect relative movement of said carriers in the several directions and provided with electrically energized controls for rendering the respective mechanisms operative, of a control set comprising switches connected in series with the respective mechanism controls, an actuator for the successive closing of said switches, and means for the step-by-step advance of said actuator from one switch to the next, said means comprising a rotary timer, driving connections for the timer controlled in the closing of one of said switches, a stop adjustable in the path of timer advance, and means actuated by said stop for returning the timer to its initial position and advancing said actuator to a successive switch.

30. In a machine tool the combination of a plurality of supports respectively movable in different mutually transverse paths, transmission mechanism selectively adjustable for alternative actuation of said supports each in either direction in its own path and also selectively adjustable to effect simultaneous actuation of said supports each in either direction in its own path, whereby to effect movement in either direction of said paths and also in either direction of at least two other mutually transverse paths, and control mechanism for said selective adjustment of said transmission mechanism including a rotary controller member having at least eight angular positions respectively corresponding to different of said transmission adjustments and power means for operation of said controller.

31. In a machine tool the combination of a plurality of supports respectively movable in different mutually transverse paths, transmission mechanism selectively adjustable for alternative actuation of said supports each in either direction in its own path and also selectively adjustable to effect simultaneous actuation of said supports each in either direction of its own path, whereby to effect movement in either direction of each of said paths and also in either direction of at least two other mutually transverse paths, control mechanism for said selective adjustment of said transmission mechanism including a rotary controller member having at least eight angular positions respectively corresponding to different of said transmission adjustments and including power means for adjustment of said member, and other control mechanism including pattern and tracer controlled means controlling support movement in at least one of said paths.

32. In a machine tool the combination of a work support and a tool support relatively movable in mutually transverse paths, transmission mechanism selectively adjustable for actuation of the supports in either direction in either of said paths, control mechanism for said selective adjustment of the transmission mechanism including a rotary controller member having at least four angular positions respectively corresponding to different of said transmission adjustments, power means for rotation of said controller member, and control means for connecting said power means for movement of said controller member from one to another of said angular positions thereof at a predetermined point in said relative support movement.

33. In a machine tool the combination of a plurality of supports respectively movable in different mutually transverse paths, transmission mechanism selectively adjustable for alternative actuation of said supports each in either direction of its own path and also selectively adjustable to effect simultaneous actuation of said supports each in either direction of its own path, whereby to effect movement in either direction of said paths and also in either direction of at least two other mutually transverse paths, control mechanism for said selective adjustment of said transmission mechanism including a rotary controller member having at least eight angular positions respectively corresponding to different of said transmission adjustments, power means for rotation of said control member, and control means for connecting said power means for movement of said member from one to another of said angular positions thereof at a predetermined point in said support movement.

34. In a machine tool the combination of a work support and a tool support relatively movable in mutually transverse paths, transmission mechanism selectively adjustable for actuation of the supports in either direction in either of said paths, control mechanism for said selective adjustment of the transmission mechanism including a rotary controller member having at least four angular positions respectively corresponding to different of said transmission adjustments, other control mechanism including pattern and tracer controlled means controlling relative movement in at least one of said paths, power means for rotation of said controller member, and control means for connecting said power means for movement of said controller member from one to another of said angular positions thereof at a point in said relative support movement determined by said other control mechanism.

35. In a machine tool the combination of a plurality of supports respectively movable in different mutually transverse paths, transmission mechanism selectively adjustable for alternative actuation of said supports each in either direction in its own path and also selectively adjustable to effect simultaneous actuation of said supports each in either direction of its own path, whereby to effect movement in either direction of each of said paths and also in either direction of at least two other mutually transverse paths, control mechanism for said selective adjustment of the transmission mechanism including a rotary controller member having at least eight angular positions respectively corresponding to different of said transmission adjustments, other control mechanism including pattern and tracer controlled means controlling support movement in at least one of said paths, power means for rotation of said controller member, and control means for connecting said power means for movement of said controller member from one to another of said angular positions thereof at a point in said relative support movement determined by said other control mechanism.

36. In a tracer controlled duplicating machine, the combination with tracer and work supports mounted for relative movement along a line to and from each other and two other lines transverse to each other and to the line first mentioned, and power operated driving connections for effecting movement in both directions along each of such lines, of a tracer mounted on the tracer support and including a stylus directed toward the other support, a stylus mounting upon which the stylus is universally oscillatable in response to lateral pressure and is axially yieldable in response to end thrust, contact means disposed about said stylus and connected to be actuated by lateral stylus displacement according to the direction of the pressure occasioning such displacement, and a separate contact means operatively connected to the stylus to be actuated according to the position of axial displacement thereof, together with means including circuit connections controlled by the last contact means for controlling the actuating connections which effect movement of said supports to and from each other, and means including circuit connections controlled by said first contact means for controlling relative actuation of said supports along their other two lines of relative movement.

37. The device of claim 36, in which the contact means opened and closed according to the axial displacement of the stylus includes a normally closed switch, openable upon axial stylus displacement, said switch normally effecting feed of said supports toward each other, and a second switch closable upon axial displacement of the stylus and comprising means for effecting feed of said supports away from each other.

38. The device of claim 36, in which the contact means opened and closed according to the axial displacement of the stylus includes a normally closed switch, openable upon axial stylus displacement, said switch normally effecting feed of said supports toward each other, and a second switch closable upon axial displacement of the stylus and comprising means for effecting feed of said supports away from each other, said stylus having connections to said last mentioned switches for the opening of the normally closed switch whenever the stylus is displaced laterally, and whenever displaced.

39. The structure of claim 36, in further combination with means for biasing said stylus toward a predetermined central position, said biasing means including an electromagnetic element and an armature element, one of said elements being mounted for movement with respect to the other, motion transmitting connections from the movable element to said stylus for acting on the stylus in a direction to center the stylus, and means for intermittently energizing the electromagnetic element and intermittently de-energizing said element, whereby to leave said element substantially free of the bias effect of said biasing means for a portion of the time, said biasing means being capable of exerting strong biasing pressure for the centralizing of said stylus during another portion of the time.

40. A duplicating machine comprising the combination with relatively movable supports and a tracer mounted on one of the supports and provided with a stylus and normally closed switch means disposed about the stylus and having contact means connected with the stylus to be opened upon displacement of the stylus according to the direction of such displacement, actuating connections for effecting relative movement of said supports in different directions, electric control means for rendering said connections operative and including circuits leading through said switch means to be controlled thereby, said circuits including additional switch means in series with said stylus controlled switch means, and said additional switch means being disposed in a portable control set having flexible electrical connections through which said circuit means are completed.

41. A duplicating machine comprising the combination with a plurality of supports and means mounting said supports for relative movement in each of two directions along each of a plurality of transverse lines, electrically controlled means for effecting relative movement between the supports in each of the several directions, a tracer mounted on one of said supports and comprising a stylus projecting toward the other support and means swivelling said stylus for universal oscillatory displacement from a predetermined central position, a plurality of switch means disposed about said stylus in positions corresponding to the relative directions of movement between said supports along said lines, said means including stationary contacts and also movable contacts, the latter being connected with the stylus to be moved respecting the stationary contacts according to the direction of oscillatory displacement of the stylus, a master control comprising switch means corresponding to the switch means having stylus actuated contacts, and electrical circuit connections for the electrically controlled actuating means for said supports, each of said circuit connections including a stylus controlled switch means and a master control switch means in series.

42. The structure of claim 41, in which the stylus controlled switch means are normally closed and are opened by stylus displacement, the particular switch means opened being dependent upon the direction of such displacement, and the master control switch means being selectively operable to determine the effect on the actuating connections of the opening of one of the switch means by the stylus.

43. The device of claim 41, in which the master control is portable and the circuit connections thereto are flexible and of sufficient length to enable the master control to be desirably positioned with respect to the relative movement of said supports.

44. A duplicating machine comprising a pair of relatively movable supports, means mounting said supports for relative movement along transverse lines, electrically controlled actuating connections for effecting relative movement between said supports along said lines, and control switches operatively regulating the electrical connections and including an indexing contactor for successively opening and closing the respective switches, and means for the power operation of said contactor in a step-by-step movement.

45. The device of claim 44, in which said last mentioned means comprises a reversing connection, whereby periodically to reverse the indexing movement of said contactor and the sequence in which said switches are actuated thereby.

46. A duplicating machine comprising the combination with relatively movable supports and means for effecting "in" and "out" movement therebetween, of a tracer controlling such movement and mounted on one of said supports and provided with a stylus projecting toward the other, contact means connected with the stylus, stationary "in" and "out" contacts on either side of the first mentioned contact means and with which the first contact means is selectively engageable for effecting "in" and "out" movement, means lightly biasing the first contact means toward engagement with the "in" contact for effecting inward movement, and means for intermittently increasing such bias, the first mentioned contact means being almost free of bias except when acted upon by said last mentioned means, whereby the stylus and the contact means first mentioned are relatively sensitive for movement toward the "out" contact when said bias increasing means is ineffective and are relatively sensitive toward said "in" contact when said bias increasing means is effective.

EMIL R. LOCHMAN.

(References on following page)

REFERENCES CITED

The following references are of record in the file of this patent:

UNITED STATES PATENTS

| Number | Name | Date |
|---|---|---|
| 995,683 | Kearney et al. | June 20, 1911 |
| 1,305,191 | Bryce | May 27, 1919 |
| 1,683,581 | Shaw | Sept. 4, 1928 |
| 1,774,279 | Lochman | Aug. 26, 1930 |
| 1,904,641 | Archea | Apr. 18, 1933 |
| 2,007,899 | Shaw et al. | July 9, 1935 |
| 2,148,326 | Siekmann | Feb. 21, 1939 |
| 2,161,398 | Yingling | June 6, 1939 |
| 2,162,491 | Rosen | June 13, 1939 |
| 2,234,775 | Parsons | Mar. 11, 1941 |
| 2,254,229 | Lochman | Sept. 2, 1941 |